US008859636B2

(12) United States Patent
Kamada et al.

(10) Patent No.: US 8,859,636 B2
(45) Date of Patent: Oct. 14, 2014

(54) INK COMPOSITION, INK SET, AND IMAGE FORMING METHOD

(75) Inventors: Toshihiro Kamada, Kanagawa (JP); Takahiro Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 13/299,358

(22) Filed: Nov. 18, 2011

(65) Prior Publication Data

US 2012/0141679 A1 Jun. 7, 2012

(30) Foreign Application Priority Data

Dec. 3, 2010 (JP) ................. 2010-270535

(51) Int. Cl.
| | |
|---|---|
| C08F 2/46 | (2006.01) |
| C08J 3/28 | (2006.01) |
| C09D 11/00 | (2014.01) |
| C09D 11/10 | (2014.01) |
| C09D 11/54 | (2014.01) |
| C09D 11/101 | (2014.01) |
| C09D 11/40 | (2014.01) |

(52) U.S. Cl.
CPC .............. C09D 11/54 (2013.01); C09D 11/101 (2013.01); C09D 11/40 (2013.01)
USPC ................. 522/173; 522/71; 522/74; 522/84; 522/113; 522/114; 522/116; 522/175; 427/288; 347/20; 347/21; 347/96; 347/100; 347/102; 347/51; 347/52; 347/105

(58) Field of Classification Search
USPC ........ 427/288; 522/71, 74, 84, 113, 114, 116, 522/173, 175; 106/31.13, 31.6; 347/5, 15, 347/20, 21, 40, 43, 50, 51, 52, 95–102
See application file for complete search history.

(56) References Cited

U.S. PATENT DOCUMENTS

| | | | | |
|---|---|---|---|---|
| 4,986,850 A * | 1/1991 | Iwata et al. ................. | 106/31.36 |
| 5,180,425 A * | 1/1993 | Matrick et al. .............. | 106/31.58 |
| 5,302,197 A * | 4/1994 | Wickramanayke et al. ........... | 106/31.76 |
| 5,948,155 A * | 9/1999 | Yui et al. ..................... | 106/31.58 |
| 5,997,623 A * | 12/1999 | Lin ............................. | 106/31.58 |
| 6,013,124 A * | 1/2000 | Saibara et al. ............. | 106/31.86 |
| 6,090,236 A * | 7/2000 | Nohr et al. ................. | 156/275.5 |
| 6,102,998 A * | 8/2000 | Iu et al. ...................... | 106/31.58 |
| 6,127,453 A * | 10/2000 | Erdtmann et al. ............ | 523/160 |
| 6,538,049 B1 * | 3/2003 | Kappele et al. ............... | 523/161 |
| 6,613,815 B2 * | 9/2003 | Lin ............................. | 523/160 |
| 6,676,736 B2 * | 1/2004 | Nakano et al. ............. | 106/31.58 |
| 6,830,612 B1 * | 12/2004 | Yatake et al. .............. | 106/31.58 |
| 6,846,352 B2 * | 1/2005 | Yatake ....................... | 106/31.58 |
| 6,962,965 B2 * | 11/2005 | Yeager ....................... | 528/205 |
| 7,285,310 B2 * | 10/2007 | Kanke et al. ................. | 427/466 |
| 7,442,245 B2 * | 10/2008 | Blease et al. .............. | 106/31.58 |
| 7,537,651 B2 * | 5/2009 | Park et al. .................. | 106/31.51 |
| 7,888,406 B2 * | 2/2011 | Yatake ........................ | 523/160 |
| 7,938,900 B2 * | 5/2011 | Fechner et al. ............ | 106/31.86 |
| 8,142,558 B2 * | 3/2012 | Robertson et al. .......... | 106/31.58 |
| 8,292,418 B2 * | 10/2012 | Kato et al. ..................... | 347/100 |
| 8,475,578 B2 * | 7/2013 | Dodge et al. ............... | 106/31.48 |
| 8,529,047 B2 * | 9/2013 | Yasuda et al. ................ | 347/100 |
| 8,613,509 B2 * | 12/2013 | Nagase et al. ................ | 347/100 |
| 8,690,306 B2 * | 4/2014 | Amao et al. .................. | 347/100 |
| 8,752,949 B2 * | 6/2014 | Sasada et al. ................ | 347/100 |
| 2009/0235842 A1 | 9/2009 | Ikoshi et al. | |
| 2010/0075052 A1 * | 3/2010 | Irita ............................. | 427/288 |

FOREIGN PATENT DOCUMENTS

| | | |
|---|---|---|
| JP | 2004-285135 | 10/2004 |
| JP | 2004-323753 A | 11/2004 |
| JP | 2005-126550 A | 5/2005 |
| JP | 2009-215357 | 9/2009 |
| JP | 2009-256618 | 11/2009 |
| JP | 2010-070693 | 4/2010 |

OTHER PUBLICATIONS

Japanese Office Action dated Oct. 30, 2012, issued in corresponding Japanese Patent Application.

* cited by examiner

*Primary Examiner* — Sanza McClendon
(74) *Attorney, Agent, or Firm* — SOLARIS Intellectual Property Group, PLLC

(57) ABSTRACT

An ink composition includes: (Component a) a polymerizable compound having an ethylenically unsaturated double bond; (Component b) a polymerization initiator; (Component c) water; and (Component d) a polyhydric alcohol having an alkyleneoxy chain, wherein the (Component a) polymerizable compound includes a monofunctional polymerizable monomer having a (meth)acrylamide structure, and a content of the monofunctional polymerizable monomer is 5% by mass or more with respect to a total content of the (Component a) polymerizable compound.

17 Claims, No Drawings

INK COMPOSITION, INK SET, AND IMAGE FORMING METHOD

CROSS-REFERENCE TO RELATED APPLICATION

This application claims priority under 35 USC 119 from Japanese Patent Application No. 2010-270535, filed on Dec. 3, 2010, the disclosure of which is incorporated by reference herein.

BACKGROUND OF THE INVENTION

1. Field of Invention

The present invention relates to an ink composition, an ink set, and an image forming method using the same.

2. Description of the Related Art

In recent years, as a result of ever-increasing demand for the protection of resources, the protection of the environment, the enhancement of operational stability, and the like, the conversion of coating materials and inks into water-based products has steadily progressed. As a means for enhancing the fixability of a printed image obtained by using a water-based ink, for example, an ultraviolet ray curable water-based ink is conventionally known.

Japanese Patent Application Laid-Open (JP-A) No. 2004-323753 discloses an inkjet recording ink containing a compound obtained by reacting a polyhydric alcohol having a specific structure with a compound having at least two (meth) acrylamide groups in a molecule thereof, and a photopolymerization initiator.

JP-A No. 2005-126550 discloses an active ray-curable inkjet ink composition that is substantially free from water, a composition containing a polyether polyol compound, a photopolymerizable monomer, and a photoinitiator.

SUMMARY OF THE INVENTION

However, in the methods disclosed in JP-A Nos. 2004-323753 and 2005-126550, no investigation has been conducted on the reduction of the phenomenon of color transfer of a formed image to an adhesive tape when the tape is adhered onto and then detached from the image (i.e., adhesiveness of an ink to a recording medium in a tape-detachment test), and thus there is still room for improvement in resistance to color transfer at the time of tape adhesion. Also, no investigation has been conducted on the improvement in reducing off-set of an image (i.e., rub-off resistance), which is generated when weight is applied to the image, such as in a case in which plural sheets of paper on which images have been recorded by an inkjet recording method are stacked, and thus there is still room for improvement in rub-off resistance.

The present invention has been made in view of the above circumstances, and is directed to provide an ink composition that exhibits an excellent adhesiveness of an ink to a recording medium in a tape-detachment test and an excellent rub-off resistance, an ink set, and an image forming method.

The present invention has been made in view of the above circumstances and provides an ink composition, an ink set, and an image forming method.

According to a first aspect of the invention, there is provided an ink composition, including:
(Component a) a polymerizable compound having an ethylenically unsaturated double bond;
(Component b) a polymerization initiator;
(Component c) water; and
(Component d) a polyhydric alcohol having an alkyleneoxy chain,
wherein the (Component a) polymerizable compound includes a monofunctional polymerizable monomer having a (meth)acrylamide structure, and
a content of the monofunctional polymerizable monomer is 5% by mass or more with respect to a total content of the (Component a) polymerizable compound.

According to a second aspect of the invention, there is provided an ink set, including:
an ink composition including:
(Component a) a polymerizable compound having an ethylenically unsaturated double bond;
(Component b) a polymerization initiator; and
(Component c) water,
wherein the (Component a) polymerizable compound includes a monofunctional polymerizable monomer (a1) having a (meth)acrylamide structure, and
wherein a content of the monofunctional polymerizable monomer (a1) is 5% by mass or more with respect to a total content of the (Component a) polymerizable compound; and
a treatment liquid including:
(Component e) an aggregating agent that is capable of forming an aggregate upon contact with the ink composition; and
(Component f) a polyhydric alcohol having an alkyleneoxy chain.

According to a third aspect of the invention, there is provided a method of forming an image, the method including:
providing an ink set including the ink composition according to the first aspect of the invention and a treatment liquid including (Component e) an aggregating agent that is capable of forming an aggregate upon contact with the ink composition;
applying, to a recording medium, the treatment liquid included in the ink set; and
applying, on the recording medium, the ink composition included in the ink set to form an image.

DETAILED DESCRIPTION OF THE INVENTION

According to an aspect of the invention, an image exhibiting an excellent rub-off resistance and an excellent adhesiveness of an ink to a recording medium in a tape-detachment test is successfully obtained by using an ink composition including: (Component a) a polymerizable compound having an ethylenically unsaturated double bond, the (Component a) including a monofunctional polymerizable monomer having a (meth)acrylamide structure (hereinafter, sometimes referred to as a "monofunctional polymerizable monomer (a1) having a (meth)acrylamide structure" or a "monofunctional polymerizable monomer (a1)"); (Component b) a polymerization initiator; and (Component c) water, in which the monofunctional polymerizable monomer (a1) is included in a specific content with respect to the total content of the (Component a), together with (Component d) a polyhydric alcohol having an alkyleneoxy chain or (Component f) a polyhydric alcohol having an alkyleneoxy chain (which may be simply referred to as "Component d" or "Component f", or generically simply referred to as a "polyhydric alcohol." The (Component d) polyhydric alcohol can be the same as or different from the (Component f) polyhydric alcohol. The specifics, including examples and preferable ranges, of the (Component f) polyhydric alcohol are the same as those of (Component d) polyhydric alcohol except for the content.). Hereinbelow, these are described in detail.

According to a first aspect of the invention, an ink composition is provided which includes:
(Component a) a polymerizable compound having an ethylenically unsaturated double bond;
(Component b) a polymerization initiator;
(Component c) water; and
(Component d) a polyhydric alcohol having an alkyleneoxy chain,
wherein the (Component a) polymerizable compound includes a monofunctional polymerizable monomer (a1) having a (meth)acrylamide structure, and
a content of the monofunctional polymerizable monomer (a1) is 5% by mass or more with respect to a total content of the (Component a) polymerizable compound in the ink composition.

According to a second aspect of the invention, an ink set is provided which includes:
an ink composition including:
(Component a) a polymerizable compound having an ethylenically unsaturated double bond;
(Component b) a polymerization initiator; and
(Component c) water,
wherein the (Component a) polymerizable compound includes a monofunctional polymerizable monomer (a1) having a (meth)acrylamide structure, and
wherein a content of the monofunctional polymerizable monomer (a1) is 5% by mass or more with respect to a total content of the (Component a) polymerizable compound; and
a treatment liquid including:
(Component e) an aggregating agent that is capable of forming an aggregate upon contact with the ink composition; and
(Component f) a polyhydric alcohol having an alkyleneoxy chain.

Hereinbelow, description will be given to the first aspect of the invention.

According to the first aspect of the invention, an ink composition is provided which includes:
(Component a) a polymerizable compound having an ethylenically unsaturated double bond;
(Component b) a polymerization initiator;
(Component c) water; and
(Component d) a polyhydric alcohol having an alkyleneoxy chain,
wherein the (Component a) polymerizable compound includes a monofunctional polymerizable monomer (a1) having a (meth)acrylamide structure, and
a content of the monofunctional polymerizable monomer (a1) is 5% by mass or more with respect to a total content of the (Component a) polymerizable compound.

Ink Composition

The ink composition according to the first aspect of the invention includes:
(Component a) a polymerizable compound having an ethylenically unsaturated double bond;
(Component b) a polymerization initiator; and (Component c) water, and (Component d) a polyhydric alcohol having an alkyleneoxy chain; in which a content of a monofunctional polymerizable monomer (a1) having a (meth)acrylamide structure is 5% by mass or more with respect to the total content of the (Component a). If necessary, the ink composition may further contain a water-soluble organic solvent and other components. Hereinbelow, respective components are described in detail.

(Component d) Polyhydric Alcohol Having Alkyleneoxy Chain

The ink composition according to the invention contains, as an essential component a polyhydric alcohol having an alkyleneoxy chain. The alkyleneoxy chain included in the polyhydric alcohol having an alkyleneoxy chain is not particularly limited as long as it is a chain which has at least one unit formed from an alkylene group and an oxygen atom (i.e., an alkyleneoxy group unit represented by —R—O—, in which R represents an alkylene group), and which has a hydroxyl group at a terminal thereof. The polyhydric alcohol having an alkyleneoxy chain as used herein is not particularly limited as long as it is a polyhydric alcohol having the alkyleneoxy chain defined above. In the invention, a polyhydric alcohol refers to a dihydric or higher-hydric alcohol, that is, an alcohol having at least two hydroxyl groups in a molecule thereof.

As the (Component d) used in the invention, the polyhydric alcohol is preferably a dihydric to hexahydric alcohol, more preferably a trihydric to hexahydric alcohol, and most preferably a tetrahydric to hexahydric alcohol.

Regarding the alkyleneoxy chain included in the polyhydric alcohol used in the invention, the number of unit(s) formed from an alkylene group and an oxygen atom (i.e., —R—O— in which R represents an alkylene group) is preferably from 1 to 6, and more preferably 1 or 2.

In the invention, it is preferable that the alkyleneoxy chain included in the polyhydric alcohol having an alkyleneoxy chain have a structure represented by the following Formula 1.

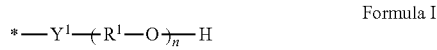

Formula 1

In Formula 1, $R^1$ represents an alkylene group; $Y^1$ represents a single bond or —O—; n represents an integer of from 1 to 6; and when plural $R^1$'s are present, plural $R^1$'s may be the same as or different from one another.

In Formula 1, the alkylene group represented by $R^1$ is not particularly limited, but is preferably an alkylene group having from 2 to 6 carbon atoms, more preferably an alkylene group having 2 or 3 carbon atoms, and most preferably an alkylene group having 2 carbon atoms (i.e., an ethylene group). The alkylene group may be a straight-chained alkylene group, a branched alkylene group, or a cyclic alkylene group, but is preferably a straight-chained or branched alkylene group. The alkylene group may or may not have a substituent, but it is preferable that the alkylene group do not have a substituent (i.e., an unsubstituted alkylene group).

Examples of the substituent which may be held by the alkylene group include, but not limited to, an alkoxy group and a halogen atom. Specific examples of the alkoxy group include a methoxy group, an ethoxy group, and a propoxy group. Specific examples of the halogen atom include a fluorine atom, a chlorine atom, a bromine atom, and an iodine atom.

The polyhydric alcohol used in the invention is more preferably a compound represented by the following Formula 2.

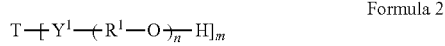

Formula 2

In Formula 2, T represents a residue obtained by removing m hydrogen atoms from a hydrocarbon; $R^1$ represents an alkylene group; $Y^1$ represents a single bond or —O—; m represents an integer of from 2 to 6; n represents an integer of from 1 to 6; plural $Y^1$'s may be the same as or different from one another; and plural $R^1$'s may be the same as or different from one another.

The residue which is obtained by removing m hydrogen atoms from a hydrocarbon and is represented by T is not particularly limited, but is preferably a residue obtained by removing m hydrogen atoms from a saturated hydrocarbon having 1 to 10 carbon atoms, more preferably having 2 to 5 carbon atoms, and further more preferably having 2 carbon atoms. The saturated hydrocarbon may have a straight-chained structure, a branched structure, or a cyclic structure. The hydrocarbon may contain a bond such as an ether bond (—O—) between a carbon-carbon bond included therein. Examples of the hydrocarbon include, but not limited to, 2,2-dimethylpropane, hexane, 2-methylpropane, and diethyl ether.

The polyhydric alcohol according to the invention has a molecular weight (or a weight average molecular weight in a case of reciting a molecular weight distribution) of preferably from 100 to 10,000, more preferably from 100 to 2,000, and further more preferably from 150 to 1,000.

The weight average molecular weight is measured with a gel permeation chromatography (GPC). A GPC instrument, HLC-8020GPC manufactured by Tosoh Corporation, is used; the columns (three in number) to be used are TSKgel Super HZM-H, TSKgel SuperHZ4000, and TSKgel SuperHZ200 (all manufactured by Tosoh Corporation, 4.6 mmID×15 cm); and THW (tetrahydrofuran) is used as an eluent.

Examples of commercially-available products of polyhydric alcohol which may be preferably used include pentaerythritol polyoxyethylene ether (trade name: PNT-40, manufactured by Nippon Nyukazai Co., Ltd.), polyoxypropylene sorbitol ether (trade name: SANNIX SP-750, manufactured by Sanyo Chemical Industries, Ltd.), polyoxypropylene glyceryl ether (trade name: SANNIX GP-250, manufactured by Sanyo Chemical Industries, Ltd.), SANNIX GP-400 (trade name, manufactured by Sanyo Chemical Industries, Ltd.), SANNIX GP-600 (trade name, manufactured by Sanyo Chemical Industries, Ltd.), SANNIX GP-1000 (trade name, manufactured by Sanyo Chemical Industries, Ltd.), SANNIX GP-3000 (trade name, manufactured by Sanyo Chemical Industries, Ltd.), and SANNIX GP-4000 (trade name, manufactured by Sanyo Chemical Industries, Ltd.). Pentaerythritol polyoxyethylene ether, polyoxypropylene sorbitol ether, and polyoxypropylene glyceryl ether are preferable.

The total content of the polyhydric alcohol in the ink composition according to the first aspect of the invention is preferably from 0.5% by mass to 30% by mass, more preferably from 1% by mass to 25% by mass, and most preferably from 3% by mass to 20% by mass. The content of 0.5% by mass or more is preferable from the viewpoint of curing sensitivity, and the content of 30% by mass or less from the viewpoint of ink viscosity. In the invention, the polyhydric alcohol may be used singly or in combination of two or more thereof.

(Component a) Polymerizable Compound Having Ethylenically Unsaturated Double Bond The ink composition of the invention contains at least one polymerizable compound having an ethylenically unsaturated bond. In the invention, it is essential that, in the ink composition, a content of a monofunctional polymerizable monomer (a1) having a (meth)acrylamide structure, which is described below, is 5% by mass or more with respect to the total content of the polymerizable compound having an ethylenically unsaturated bond. The polymerizable compound having an ethylenically unsaturated bond may be a water-insoluble compound or a water-soluble compound, but is preferably a water-soluble polymerizable compound having an ethylenically unsaturated bond. The term "water-soluble" as used herein refers to a state in which the polymerizable compound having an ethylenically unsaturated bond is capable of dissolving in distilled water at 25° C., in an amount of 2% by mass or more, preferably in an amount of 5% by mass or more, more preferably in an amount of 10% by mass or more, and further more preferably in an amount of 20% by mass or more, and it is particularly preferable that the polymerizable compound in an arbitrary proportion uniformly dissolves in water.

The polymerizable compound having an ethylenically unsaturated bond may be any compound as long as it is a compound having, in a molecule thereof, at least one ethylenically unsaturated bond that enables radical polymerization. Examples thereof include various chemical configurations of a monomer, an oligomer, and a polymer, and a monomer is preferable.

The polymerizable compounds having an ethylenically unsaturated bond may be used singly, or in combination of two or more thereof in arbitrary proportions for improving a desired property. From the viewpoint of ejection stability of an ink, it is preferable to use a compound which has excellent water solubility and which has less tendency to precipitate in an ink composition.

In the invention, the "monofunctional polymerizable monomer" refers to a polymerizable monomer having one polymerizable group, and the "polyfunctional polymerizable monomer" refers to a polymerizable monomer having at least two polymerizable groups.

Examples of the polymerizable compound having an ethylenically unsaturated double bond, which is contained in the ink composition of the invention, include, but not limited to, a monofunctional polymerizable monomer (a1) having a (meth)acrylamide structure, a polyfunctional polymerizable monomer having a (meth)acrylamide structure, and a polymerizable monomer having a structure other than a (meth)acrylamide structure. Among these, a monofunctional polymerizable monomer (a1) having a (meth)acrylamide structure or a polyfunctional polymerizable monomer having a (meth)acrylamide structure is preferable. Hereinbelow, detailed description are given to respective polymerizable compounds having an ethylenically unsaturated bond according to the invention.

Monofunctional Polymerizable Monomer (a1) Having (Meth)Acrylamide Structure

The monofunctional polymerizable monomer (a1) having a (meth)acrylamide structure, which is included as an essential component in the polymerizable compound having an ethylenically unsaturated double bond according to the invention, is not limited as long as it is a polymerizable monomer which has a (meth)acrylamide structure and has one polymerizable group. It should be noted that the recitation "(meth)acrylamide" refers to at least one of acrylamide and methacrylamide.

In the invention, the monofunctional polymerizable monomer (a1) having a (meth)acrylamide structure is preferably a polymerizable monomer having a structure represented by Formula (M-1).

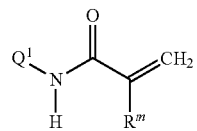

(M-1)

In Formula (M-1), $Q^1$ represents a hydrophilic group; and $R^m$ represents a hydrogen atom or a methyl group.

Examples of the hydrophilic group represented by $Q^1$ in Formula (M-1) include a hydroxyl group, a dimethylamino group, and a residue obtained by removing one hydrogen atom or hydroxyl group from any one of the following compounds (1) to (4):

(1) compounds having a saturated or unsaturated heterocyclic structure;
(2) polyols;
(3) condensed products of polyols; and
(4) a polyamines.

The residue obtained by removing one hydrogen atom or hydroxyl group from any one of the compounds (1) to (4) is not particularly limited as long as it is a group capable of linking with $Q^1$ in Formula (M-1), but is preferably selected from the groups such that the compound represented by Formula (M-1) satisfies water-solubility condition as described above. Specific examples thereof include residues obtained by removing one hydrogen atom or hydroxyl group from a compound selected from the following Compound group Z.

Compound Group Z

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 1,3-pentanediol, 2,4-pentanediol, 3-methyl-1,5-pentanediol, 2-methyl-2,4-pentanediol, 1,6-hexanediol, 1,5-hexanediol, 2,5-hexanediol, glycerin, 1,2,4-butanediol, 1,2,5-pentanetriol, 1,2,6-hexanetriol, trimethylolpropane, trimethylolethane, ditrimethylolpropane, ditrimethylolethane, thioglycol, neopentyl glycol, pentaerythritol, dipentaerythritol and condensates thereof, polyols such as sugars, and polyamines such as ethylenediamine, diethylenetriamine, triethylenetetramine, polyethyleneimine and polypropylenediamine.

Among the residues obtained by removing one hydrogen atom or hydroxyl group from the compounds (1) to (4), a residue obtained by removing one hydrogen atom or hydroxyl group from (1) a compound having a saturated or unsaturated heterocyclic structure or (2) a polyol is preferable, and specifically, a residue obtained by removing one hydrogen atom or hydroxyl group from morpholine, ethylene glycol, or propylene glycol is particularly preferable.

The hydrophilic group represented by $Q^1$ in Formula (M-1) is preferably a hydroxyl group, a dimethylamino group, or a residue obtained by removing one hydrogen atom or hydroxyl group from a compound having a saturated or unsaturated heterocyclic structure or a polyol, and is particularly preferably a residue obtained by removing one hydrogen atom or hydroxyl group from morpholine, ethylene glycol, or propylene glycol.

Specific examples of the monofunctional polymerizable monomer used in the invention include hydroxyethyl acrylamide, hydroxypropyl acrylamide, dimethylaminoethyl acrylamide, and dimethylaminopropyl acrylamide, and hydroxyethyl acrylamide is particularly preferable.

In the ink composition of the invention, the content of the monofunctional polymerizable monomer (a1) having a (meth)acrylamide structure is 5% by mass or more, preferably from 5% by mass to 100% by mass, more preferably from 10% by mass to 90% by mass, further more preferably from 10% by mass to 75% by mass, and most preferably from 50% by mass to 75% by mass, with respect to the total content of the polymerizable compound having an ethylenically unsaturated double bond. The content of the monofunctional polymerizable monomer (a1) having a (meth)acrylamide structure is preferably 5% by more from the viewpoint of ink viscosity.

Polyfunctional Polymerizable Monomer Having (Meth) Acrylamide Structure

The polyfunctional polymerizable monomer having a (meth)acrylamide structure, which may be contained in the polymerizable compound having an ethylenically unsaturated double bond used in the invention, is not particularly limited as long as it is a monomer which has a (meth)acrylamide structure in a molecule thereof and has at least two polymerizable groups. A preferable example thereof is a polyfunctional polymerizable monomer represented by the following Formula (M-2).

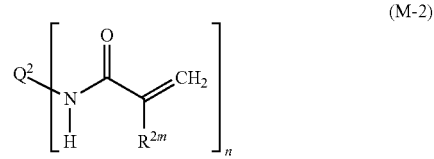

In Formula (M-2), $Q^2$ represents an n-valent linking group; $R^{2m}$ represents a hydrogen atom or a methyl group; and n represents an integer of 2 or more.

The compound represented by Formula (M-2) is a compound in which an unsaturated monomer is bonded to a linking group $Q^2$ through an amide bond. $R^{2m}$ represents a hydrogen atom or a methyl group, and preferably represents a hydrogen atom. The number "n" which is the valency number of the linking group $Q^2$ preferably represents 2 or higher (i.e., n=2 or higher), more preferably represents 2 to 6 (i.e., n=2 to 6), and further more preferably represents 2 to 4 (i.e., n=2 to 4).

The linking group $Q^2$ is not particularly limited as long as the linking group $Q^2$ is a group capable of linking with a (meth)acrylamide structure, but it is preferable that the compound represented by Formula (M-1) be selected from linking groups that satisfy the water-solubility condition described above. Specific examples thereof include residues obtained by removing two or more of hydrogen atoms or hydroxyl groups from a compound selected from Compound group X below.

Compound Group X

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 1,3-pentanediol, 2,4-pentanediol, 3-methyl-1,5-pentanediol, 2-methyl-2,4-pentanediol, 1,6-hexanediol, 1,5-hexanediol, 2,5-hexanediol, glycerin, 1,2,4-butanediol, 1,2,5-pentanetriol, 1,2,6-hexanetriol, trimethylolpropane, trimethylolethane, ditrimethylolpropane, ditrimethylolethane, thioglycol, neopentyl glycol, pentaerythritol, dipentaerythritol and condensates thereof, polyols such as sugars, and polyamines such as ethylenediamine, diethylenetriamine, triethylenetetramine, polyethyleneimine and polypropylenediamine.

Examples thereof further include a substituted or unsubstituted alkylene chain having 4 or less carbon atoms such as a methylene group, an ethylene group, a propylene group, or a butylene group; and a functional group having a saturated or unsaturated heterocycle such as a pyridine ring, an imidazole ring, a pyrazine ring, a piperidine ring, a piperazine ring, or a morpholine ring.

As the linking group $Q^2$, among the above, a residue of polyol including an oxyalkylene group (preferably an oxyethylene group) is preferable, and a residue of polyol including three or more oxyalkylene groups (preferably an oxyethylene group) is particularly preferable.

Specific examples of the polymerizable monomer having a (meth)acrylamide structure in a molecule thereof include the water-soluble polymerizable monomers shown below.

Polymerizable Compound 1

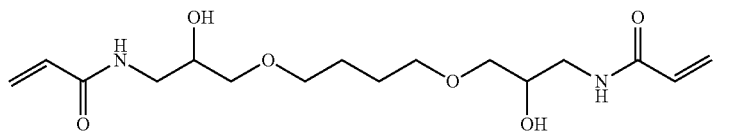

Polymerizable Compound 2

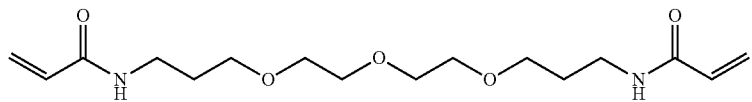

Polymerizable Compound 3

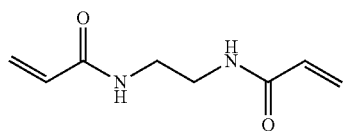

Polymerizable Compound 4

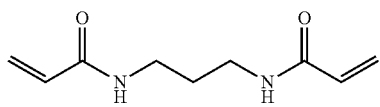

Polymerizable Compound 5

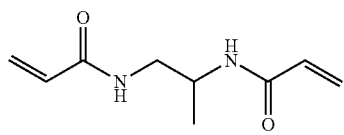

Poylmerizable Compound 6

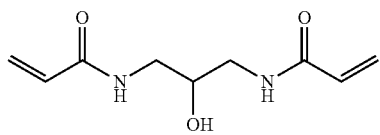

Polymerizable Compound 7

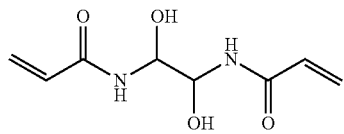

Polymerizable Compound 8

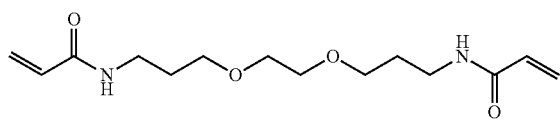

Polymerizable Compound 9

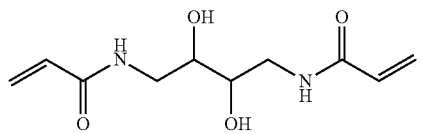

Polymerizable Compound 10

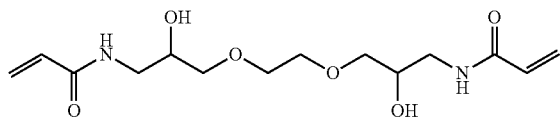

Polymerizable Compound 11

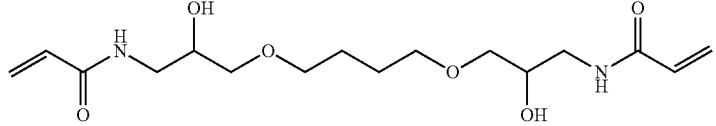

Polymerizable Compound 12

-continued
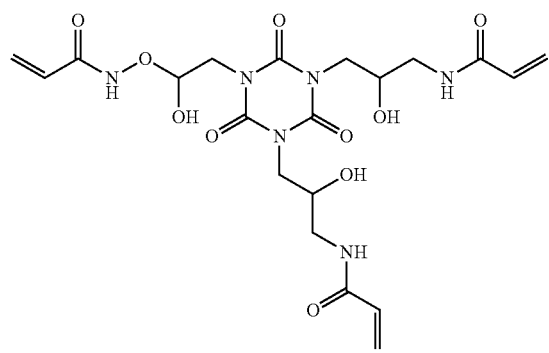
Polymerizable Compound 13
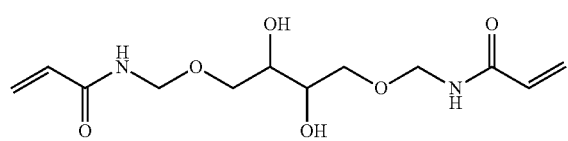
Polymerizable Compound 14
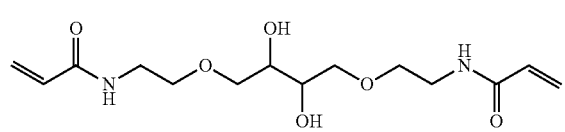
Polymerizable Compound 15
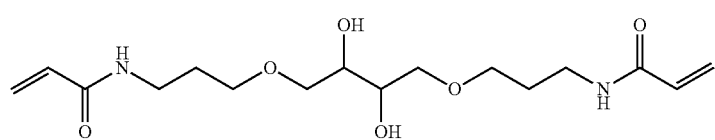
Polymerizable Compound 16
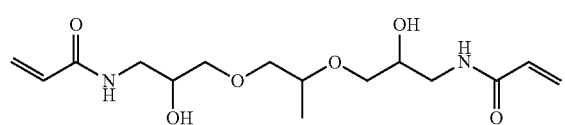
Polymerizable Compound 17
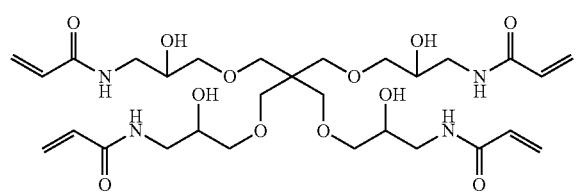
Polymerizable Compound 18
Polymerizable Compound 19     Polymerizable Compound 20
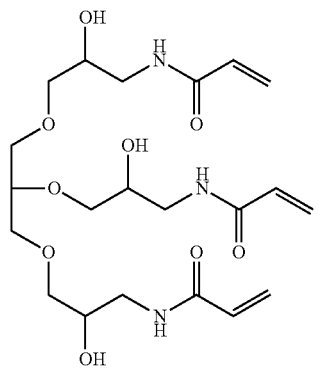 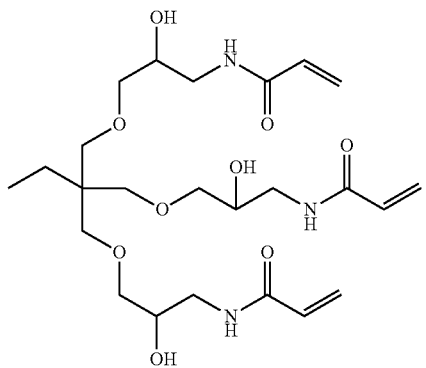
Polymerizable Compound 21     Polymerizable Compound 22
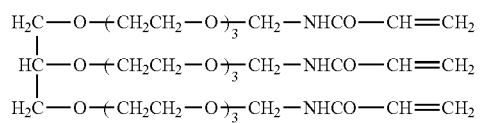 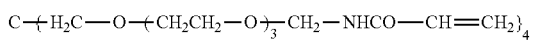

Polymerizable Compound 23
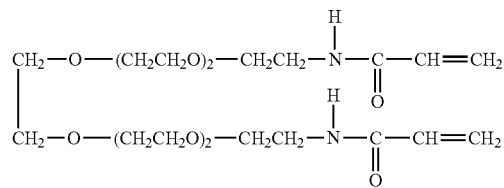
Polymerizable Compound 24
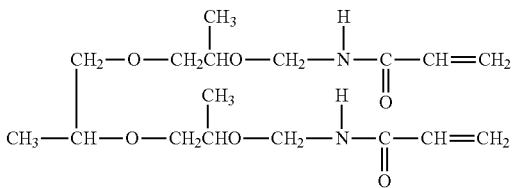
Polymerizable Compound 25
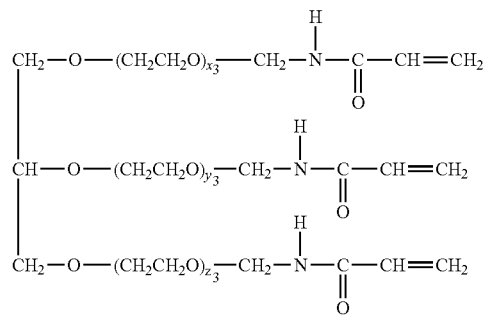
$x_3 + y_3 + z_3 = 6$
Polymerizable Compound 26
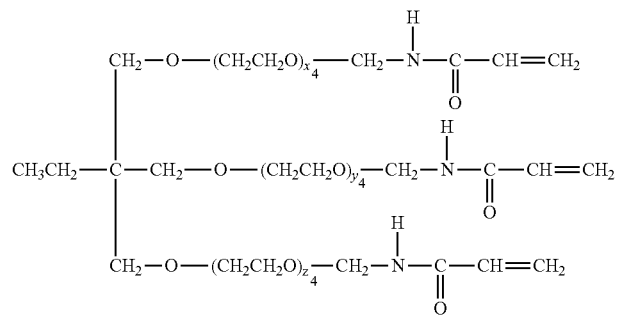
$x_4 + y_4 + z_4 = 9$
Polymerizable Compound 27
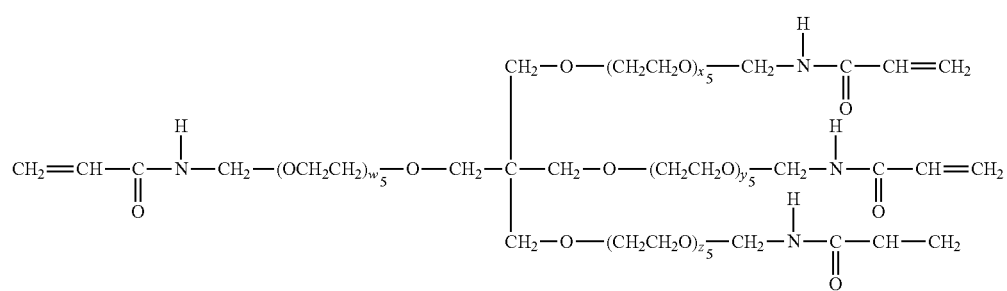
$w_5 + x_5 + y_5 + z_5 = 6$
Polymerizable Compound 28
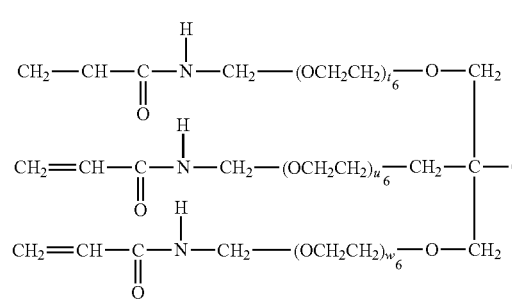
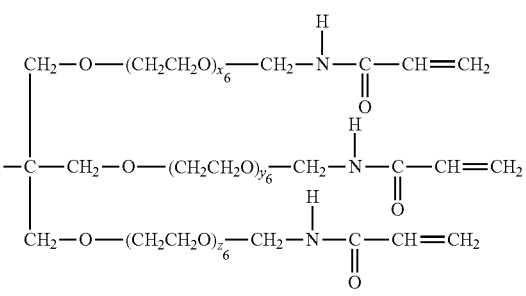
$t_6 + u_6 + w_6 + x_6 + y_6 + z_6 = 12$ -continued Polymerizable Compound 29

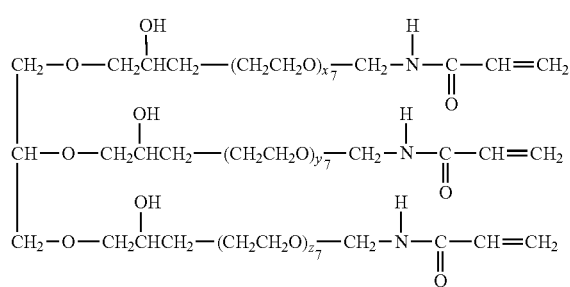

$x_7 + y_7 + z_7 = 3$

Polymerizable Compound 30

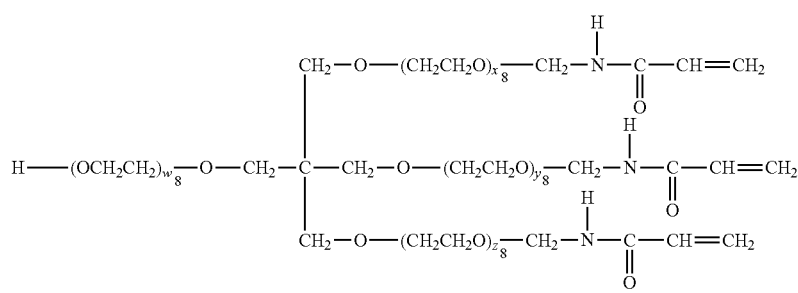

$w_8 + x_8 + y_8 + z_8 = 6$

Polymerizable Compound 31

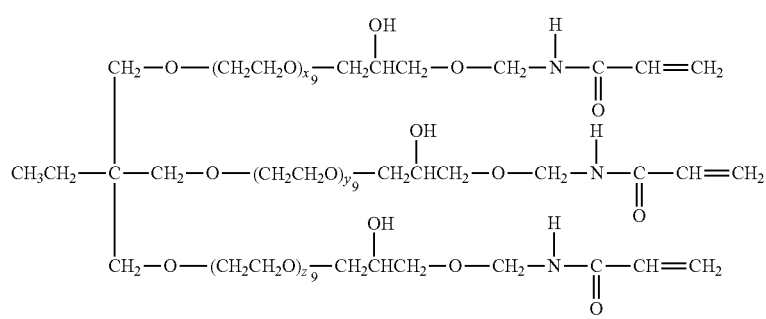

$x_9 + y_9 + z_9 = 3$

Polymerizable Compound 32

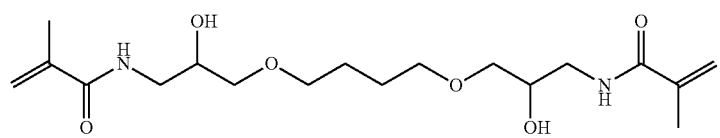

Polymerizable Monomer Having Structure Other than (Meth)Acrylamide Structure

The polymerizable monomer having a structure other than a (meth)acrylamide structure, which may be included in the polymerizable compound having an ethylenically unsaturated double bond according to the invention, is not particularly limited as long as it is a polymerizable monomer which does not has a (meth)acrylamide structure. Examples thereof include a polymerizable compound having a maleimide group, a vinylsulfonamide group, or a N-vinylamide group.

The total content of the polymerizable compound having an ethylenically unsaturated double bond in the ink composition is preferably from 5% by mass to 50% by mass, more preferably from 10% by mass to 30% by mass, and most preferably from 15% by mass to 25% by mass, with respect to the total amount of the ink composition.

(Component b) Polymerization Initiator

The ink composition of the invention contains (Component b) a polymerization initiator as an essential component.

Preferable examples of the polymerization initiator used in the invention include photopolymerization initiators. The photopolymerization initiator to be used may be appropriately selected from known photopolymerization initiators depending on the type of polymerizable monomer and the application purpose of the ink composition.

The photopolymerization initiator used in the ink composition of the invention is a compound capable of generating a radical, which is a polymerization initiating species, when it absorbs external energy (i.e., light). Examples of light include active energy rays such as a γ-ray, a β-ray, an electron ray, an X ray, an ultraviolet ray, a visible light ray, and an infrared ray.

Although any known compound may be used as the photopolymerization initiator, examples of the photopolymerization initiator preferably used in the invention include (a) aromatic ketones, (b) acylphosphine oxide compounds, (c) aromatic onium salt compounds, (d) organic peroxides, (e) thio compounds, (f) hexaarylbiimidazole compounds, (g)

ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, any one of the compounds (a) to (m) may be used singly, or a combination of two or more thereof may be used. It is preferable that the photopolymerization initiator according to the invention be used singly, or in combination of two or more thereof.

Preferable examples of the (a) aromatic ketones, (b) acylphosphine oxide compounds and (e) thio compounds include compounds having a benzophenone or thioxanthone skeleton, which are disclosed in "Radiation Curing in Polymer Science and Technology", J. P. Fouassier, J. F. Rabek (1993), pp. 77-117. More preferably, examples thereof include the α-thiobenzophenone compounds disclosed in Japanese Patent Application Publication (JP-B) No. 47-6416, the benzoin ether compounds disclosed in JP-B No. 47-3981, the α-substituted benzoin compounds disclosed in JP-B No. 47-22326, the benzoin derivatives disclosed in JP-B No. 47-23664, the aroylphosphonic acid esters disclosed in JP-A No. 57-30704, the dialkoxybenzophenones disclosed in JP-B No. 60-26483, the benzoin ethers disclosed in JP-B No. 60-26403 and JP-A No. 62-81345, the α-aminobenzophenones disclosed in JP-B No. 1-34242, U.S. Pat. No. 4,318, 791, and European Patent No. 0284561 A 1, the p-di(dim-ethylaminobenzoyl)benzene disclosed in JP-A No. 2-211452, the thio-substituted aromatic ketones disclosed in JP-A No. 61-194062, the acylphosphine sulfides disclosed in JP-B No. 2-9597, the acylphosphines disclosed in JP-B No. 2-9596, the thioxanthones disclosed in JP-B No. 63-61950, and coumarines disclosed in JP-B No. 59-42864. Furthermore, the polymerization initiators disclosed in JP-A No. 2008-105379 and JP-A No. 2009-114290 are also preferably used.

Among these, an aromatic ketone or an acylphosphine oxide compound is preferably used as the photopolymerization initiator in the invention, and it is most preferable to use an aromatic ketone as the photopolymerization initiator. Specific examples of the polymerization initiator to be used in the invention include 2-benzyl-2-dimethylamino-1-(4-morpholinophenyl)-butanone-1 (which is available as IRGACURE 369, trade name, manufactured by BASF Japan Ltd.), 2-methyl-1-(4-methylthiophenyl)-2-morpholinopropan-1-one (which is available as IRGACURE 907, trade name, manufactured by BASF Japan Ltd.), p-phenylbenzophenone (manufactured by Wako Pure Chemical Industries, Ltd.), bis (2,4,6-trimethylbenzoyl)-phenylphosphine oxide (which is available as IRGACURE 819, trade name, manufactured by BASF Japan Ltd.), bis(2,6-dimethoxybenzoyl)-2,4,4-trim-ethyl-pentylphenylphosphine oxide, 2,4,6-trimethylbenzoyl-diphenyl-phosphine oxide (which is available as DAROCUR TPO, trade name, manufactured by BASF Japan Ltd., or LUCIRIN TPO, trade name, manufactured by BASF Japan Ltd.), and 1-[4-(2-hydroxyethoxy)-phenyl]-2-hydroxy-2-methyl-1-propan-1-one (which is available as IRGACURE 2959, trade name, manufactured by BASF Japan Ltd.). Of these, 1-[4-(2-hydroxyethoxy)-phenyl]-2-hydroxy-2-methyl-1-propan-1-one is most preferable.

As the polymerization initiator used in the invention, either a water-insoluble initiator which has dispersed in water, or a water-soluble initiator may be used, and it is preferable to use a water-soluble polymerization initiator. It should be noted that the term "water solubility" as used herein refers to a state in which the polymerization initiator is capable of dissolving in distilled water at 25° C., in an amount of 0.3% by mass or more, preferably in an amount of 1% by mass or more, and more preferably in an amount of 3% by mass or more.

The polymerization initiator may be used singly, or in combination of two or more thereof.

The content of the polymerization initiator in the ink composition is preferably from 0.1% by mass to 30% by mass, more preferably from 0.5% by mass to 20% by mass, and further more preferably from 1% by mass to 15% by mass.

Meanwhile, the content of the photopolymerization initiator in the ink composition of the invention is preferably from 0.01 to 35 parts by mass, more preferably from 0.1 to 30 parts by mass, and further more preferably from 0.5 to 30 parts by mass, with respect to 100 parts by mass of the polymerizable compound having an ethylenically unsaturated double bond.

Colorant

The ink composition in the invention may contain at least one colorant. As the colorant used in the invention, known dyes, pigments, or the like may be used without particular limitation. In particular, from the viewpoint of ink coloring properties, a colorant that is almost insoluble or hardly dissolves in water is preferable. Specific examples include various pigments, disperse dyes, oil-soluble dyes, and coloring matter forming a J-aggregate. From the viewpoint of light-fastness, pigments are more preferable.

The pigment which may be contained in the ink composition in the invention is not particularly limited in the type, and conventionally known organic and inorganic pigments may be used.

Examples of the organic pigment include an azo pigment, a polycyclic pigment, a dye chelate, a nitro pigment, a nitroso pigment, and an aniline black. Among these, an azo pigment, a polycyclic pigment, and the like are more preferable. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate and an acid dye type chelate.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable. Examples of the carbon black include those manufactured by a known method such as a contact method, a furnace method, or a thermal method.

Specific examples of the pigment that may be used in the invention include the pigments disclosed in paragraphs [0142] to [0145] of JP-A No. 2007-100071.

Examples of pigments for orange or yellow include C. I. Pigment Orange 31, C. I. pigment orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C. I. Pigment Yellow 185.

Examples of pigments for magenta or red include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C. I. Pigment Red 222.

Examples of pigments for green or cyan include C. I. Pigment Blue 15, C. I. Pigment Blue 15:2, C. I. Pigment Blue 15:3, C. I. Pigment Blue 16, C. I. Pigment Blue 60, C. I. Pigment Green 7, and siloxane cross-linked aluminum phthalocyanine disclosed in U.S. Pat. No. 4,311,775.

Examples of pigments for black include C. I. Pigment Black 1, C. I. Pigment Black 6 and C. I. Pigment Black 7.

When a dye is used as the colorant, a dye supported on a water-insoluble carrier may be used. As the dye, a known dye may be used without particular limitation, and the dyes disclosed in, for example, JP-A Nos. 2001-115066, 2001-335714, and 2002-249677 may be suitably used also in the invention. As the carrier, an inorganic material, an organic material, and a composite material thereof may be used without particular limitation insofar as it is insoluble or difficult to dissolve in water. Specifically, the carriers disclosed in, for example, JP-A Nos. 2001-181549 and 2007-169418 may be preferably used also in the invention.

The carrier carrying a dye (colorant) may be used as it is or in combination with a dispersant, if required. As the dispersant, the dispersant described later can be preferably used.

The pigment described above may be used singly or in combination of two or more kinds thereof. When two or more pigments are used, the pigments may be selected from a single group among the groups described above, or from two or more groups among the groups described above.

The content of the colorant (particularly pigment) in the ink composition is preferably from 1 to 25% by mass, and more preferably from 3 to 20% by mass, with respect to the total mass of the ink composition, from the viewpoint of color density, granularity, ink stability, and ejection reliability.

Dispersant

When the colorant used in the invention is a pigment, it is preferable that the colorant form a part of color particles dispersed in a water-based solvent by a dispersant. As the dispersant, a polymer dispersant or a low-molecular-weight surfactant-type dispersant may be used. As the polymer dispersant, any of a water-soluble polymer dispersant and a water-insoluble polymer dispersant may be used.

In the invention, a water-insoluble polymer dispersant is preferable from the viewpoint of dispersion stability and ejection properties when applied to an inkjet method.

Water-Insoluble Polymer Dispersant

As the water-insoluble polymer dispersant used in the invention (hereinafter sometimes simply referred to as a "dispersant"), a conventionally known water-insoluble polymer dispersant may be used without particular limitation insofar as it is a water-insoluble polymer and can disperse a pigment. The water-insoluble polymer dispersant may contain, for example both a hydrophobic structural unit and a hydrophilic structural unit.

Examples of monomers for forming a part of the hydrophobic structural unit include a styrene monomer, alkyl (meth)acrylate, and (meth)acrylate containing an aromatic group.

A monomer for forming a part of the hydrophilic structural unit is not particularly limited insofar as the monomer contains a hydrophilic group. Examples of the hydrophilic group include a nonionic group, a carboxyl group, a sulfonic acid group, and a phosphoric acid group. Examples of the nonionic group include a hydroxyl group, an amide group (in which the nitrogen atom is not substituted), a group derived from an alkylene oxide polymer (for example, polyethylene oxide, polypropylene oxide, and the like) and a group derived from sugar alcohol.

The hydrophilic structural unit according to the invention preferably contains at least a carboxyl group from the viewpoint of dispersion stability and also preferably contains both a nonionic group and a carboxyl group.

Specific examples of the water-insoluble polymer dispersant according to the invention include a styrene-(meth)acrylic acid copolymer, a styrene-(meth)acrylic acid-(meth)acrylic acid ester copolymer, a (meth)acrylic acid ester-(meth) acrylic acid copolymer, a polyethylene glycol(meth)acrylate-(meth)acrylic acid copolymer, and a styrene-maleic acid copolymer.

Here, the "(meth)acrylic acid" refers to acrylic acid or methacrylic acid.

In the invention, the water-insoluble polymer dispersant is preferably a vinyl polymer containing a carboxyl group and more preferably a vinyl polymer having at least a structural unit derived from an aromatic group-containing monomer as the hydrophobic structural unit and having a structural unit containing a carboxyl group as the hydrophilic structural unit, from the viewpoint of the dispersion stability of a pigment.

The weight average molecular weight of the water-insoluble polymer dispersant is preferably from 3,000 to 200,000, more preferably from 5,000 to 100,000, still more preferably from 5,000 to 80,000, and particularly preferably from 10,000 to 60,000, from the viewpoint of the dispersion stability of a pigment.

The content of the dispersant in the colorant particles according to the invention is preferably from 10 to 100% by mass, more preferably from 20 to 70% by mass, and particularly preferably from 30 to 50% by mass, with respect to the content of the pigment, from the viewpoint of the dispersibility, ink coloring properties, and dispersion stability of the pigment.

When the content of the dispersant in the colorant particles is in the range mentioned above, the pigment is coated with a proper amount of a dispersant, and colorant particles having a small particle diameter and excellent stability with time tend to be obtained. Thus, the content mentioned above is preferable.

The colorant particles according to the invention may contain other dispersants in addition to the water-insoluble polymer dispersant. For example, a conventionally known water-soluble low-molecular-weight dispersant, a water-soluble polymer, and the like may be used. The content of the dispersants other than the water-insoluble polymer dispersant can be adjusted within the range of the content of the dispersant described above.

The colorant according to the invention preferably contains the pigment and the water-insoluble polymer dispersant, from the viewpoint of dispersion stability and ejection property, and preferably has a structure in which at least a part of the surface of the pigment is coated with the water-insoluble polymer dispersant. Such a colorant may be obtained as a dispersion of colorant particles by, for example, dispersing a mixture containing, for example, a pigment, a dispersant, and if required, a solvent (preferably an organic solvent), and the like with a disperser.

(Component c) Water

The ink composition of the invention contains water as an essential component, and may further contain at least one water-soluble organic solvent, if necessary.

The water used in the invention is preferably water that contains no ionic impurities, such as ion-exchange water or distilled water. The content of water in the ink composition is appropriately selected depending on the purpose, but, in general, is preferably from 10% by mass to 95% by mass, and more preferably from 30% by mass to 90% by mass.

Water-Soluble Organic Solvent

The ink composition according to the invention may contain at least one water-soluble organic solvent. When a water-soluble organic solvent is contained, effects of preventing drying, moisturizing, or accelerating penetration can be obtained. For the purpose of preventing drying, a water-soluble organic solvent is used as an anti-drying agent that prevents clogging of ejection nozzles, which may be caused due to aggregation generated by attachment and drying of an ink at an ink ejection orifice. For the purpose of preventing drying or moisturizing, a water-soluble organic solvent which has a vapor pressure lower than that of water is preferably used. Further, a water-soluble organic solvent may be used as a penetration accelerator that enhances permeability of ink into paper.

Examples of the water-soluble organic solvent include sugar alcohols; alkyl alcohols having from 1 to 4 carbon atoms such as ethanol, methanol, butanol, propanol, and isopropanol; and glycol ether such as ethylene glycol monomethyl ether, ethylene glycol monoethyl ether, ethylene glycol monobutyl ether, ethylene glycol monomethyl-ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, and tripropylene glycol monomethyl ether. The water-soluble organic solvent may be used singly or two or more kinds thereof may be used in combination.

In the invention, the water-soluble organic solvent may be used singly, or two or more thereof maybe mixed and used in combination.

The content of the water-soluble organic solvent in the ink composition is preferably from 1% by mass to 60% by mass, and more preferably from 5% by mass to 40% by mass.

Resin Particles

The ink composition in the invention may contain at least one kind of resin particles. When resin particles are contained in the ink composition, fixability of the ink composition to a recording medium, rub-off resistance of an image, and blocking resistance can be effectively improved.

The resin particles preferably have a function of fixing the ink composition, that is, an image, by increasing the viscosity of ink by aggregation or destabilization of dispersion when contacting a treatment liquid described below or a region on a recording medium to which the treatment liquid has been applied and dried. Such resin particles are preferably dispersed in water and at least one kind of the organic solvent.

Examples of resin particles that may be used in the invention include acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin, and fluororesin and latexes thereof. Preferable examples include acrylic resin, acrylic-styrene resin, styrene resin, crosslinked acrylic resin, and crosslinked styrene resin.

The resin particles may also be used in a form of latex.

The weight average molecular weight of the resin particles is preferably from 10,000 to 200,000 and more preferably from 100,000 to 200,000.

The volume average particle diameter of the resin particles is preferably in the range of from 10 nm to 1 μm, more preferably in the range of from 10 nm to 200 nm, still more preferably in the range of from 20 nm to 100 nm, and particularly preferably in the range of from 20 nm to 50 nm.

The glass transition temperature Tg of the resin particles is preferably 30° C. or more, more preferably 40° C. or more, and still more preferably 50° C. or more.

The addition amount of the resin particles is preferably from 0.1 to 20% by mass, and more preferably from 0.1 to 15% by mass, with respect to the mass of the ink.

The particle size distribution of the resin particles is not particularly limited and may be any of a broad particle size distribution and a monodispersed particle size distribution. Two or more kinds of resin particles having a monodispersed particle diameter distribution may be mixed and used.

Other Components

The ink composition of the invention may further contain additional components other than the components described above, if necessary.

Examples of the additional components include sensitizers, co-sensitizers, surfactants, ultraviolet absorbers, antioxidants, discoloration inhibitors, electroconductive salts, solvents, polymer compounds, and basic compounds described in JP-A No. 2008-019408.

Physical Properties of Ink Composition

The surface tension (25° C.) of the ink composition in the invention is preferably from 20 mN/m to 60 mN/m. The surface tension is more preferably from 20 mN/m to 45 mN/m and still more preferably from 25 mN/m to 40 mN/m.

The surface tension is determined by measuring the ink composition at 25° C. using an Automatic Surface Tensiometer CBVP-Z (trade name, manufactured by Kyowa Interface Science Co., LTD.).

The viscosity at 25° C. of the ink composition in the invention is preferably from 1.2 mPa·s to 15.0 mPa·s, more preferably from 2 mPa·s but less than 13 mPa·s, and still more preferably from 2.5 mPa·s but less than 10 mPa·s.

The viscosity is determined by measuring the ink composition at 25° using a VISCOMETER TV-22 (trade name, manufactured by TOKI SANGYO CO. LTD).

Ink Set

The ink set of the invention contains at least one ink composition, the ink composition being the ink composition described above, and at least one treatment liquid containing (Component e) an aggregating agent capable of forming an aggregate when being brought into contact with the ink composition.

In other words, the effects of the invention are improved by using: an ink composition containing (Component a) a polymerizable compound having an ethylenically unsaturated double bond, (Component b) a polymerization initiator, (Component c) water, and (Component d) a polyhydric alcohol having an alkyleneoxy chain, in which the content of a monofunctional polymerizable monomer (a1) having a (meth)acrylamide structure is 5% by mass or more with respect to the total content of the (Component a); and a treatment liquid containing (Component e) an aggregating agent. In addition to the ink composition, the treatment liquid may also contain the (Component f).

Treatment Liquid

The treatment liquid in the invention contains at least one (Component e) aggregating agent which is capable of forming an aggregate upon contact with the ink composition, and may further contain other components if necessary.

(Component e) Aggregating Agent

In the invention, the treatment liquid contains an aggregating agent capable of aggregating the components included in the ink composition. The aggregating agent used in the invention is an agent which is capable of aggregating (fixing) the ink composition when the treatment liquid is brought into contact with the ink composition on a recording medium, and which functions as a fixing agent. For example, in a state in which the aggregating agent is present on a recording medium (preferably coated paper) by applying the treatment liquid to the recording medium, droplets of the ink composition are applied and contact the aggregating agent, and thus the component in the ink composition aggregates and the component in the ink composition can be fixed on the recording medium.

Examples of the component capable of fixing the components included in the ink composition include an acidic compound, a polyvalent metal salt, and a cationic polymer, and it is preferable that the treatment liquid contain at least one selected from the group consisting of an acidic compound, a polyvalent metal salt, and a cationic polymer. The aggregating agent may be used singly, or in combination of two or more thereof.

Acidic Compound

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, and salts thereof.

Among the above, an acidic compound having high water solubility is preferable. From the viewpoint of reacting with the ink composition and fixing the entire ink, a trivalent or lower valent acidic compound is preferable, and a divalent or a trivalent acidic compound is particularly preferable.

The acidic compound may be used singly or in combination of two or more thereof.

When the treatment liquid contains the acidic compound, the pH (25° C.) of the treatment liquid is preferably from 0.1 to 6.8, more preferably from 0.5 to 6.0, and still more preferably from 0.8 to 5.0.

The content of the acidic compound is preferably 40% by mass or less and more preferably from 15 to 40% by mass, with respect to the total mass of the treatment liquid. By adjusting the content of the acidic compound to 15 to 40% by mass, the component in the ink composition can be more efficiently fixed.

The content of the acidic compound is further preferably from 15% by mass to 35% by mass and still more preferably from 20% by mass to 30% by mass, with respect to the total mass of the treatment liquid.

The application amount of the acidic compound to the recording medium is not particularly limited insofar as the amount is sufficient for aggregating the ink composition. From the viewpoint of ease of fixation of the ink composition, the application amount is preferably from 0.5 g/m$^2$ to 4.0 g/m$^2$ and more preferably from 0.9 g/m$^2$ to 3.75 g/m$^2$.

Polyvalent Metal Salt

The polyvalent metal salt used in the invention is a compound containing a divalent or higher-valent metal such as an alkali earth metal and a zinc group metal. Examples thereof include acetic acid salts and oxides of metal ions such as $Ca^{2+}$, $Cu^{2+}$, or $Al^{3+}$.

In the invention, the aggregation reaction of the ink composition when the ink composition is ejected to a recording medium (preferably a coated paper) to which the treatment liquid containing the polyvalent metal salt has been applied can be achieved by reducing the dispersion stability of the particles dispersed in the ink composition, for example, particles such as the colorant represented by a pigment, or resin particles, and increasing the viscosity of the entire ink composition. For example, when the particles such as the pigment or the resin particles in the ink composition have a weak acid functional group such as a carboxyl group, the particles are stably dispersed due to the function of the weak acid functional group but the dispersion stability can be reduced by reducing the surface charge of the particles by interaction with the polyvalent metal salts. Accordingly, from the viewpoint of the aggregation reaction, the polyvalent metal salt as a fixing agent contained in the treatment liquid needs to be divalent or higher valent, that is, polyvalent, and, from the viewpoint of the aggregation reactivity, the polyvalent metal salt is preferably a polyvalent metal salt containing a trivalent or higher-valent metal ion.

From the viewpoints described above, the polyvalent metal salt that can be used in the treatment liquid according to the invention is preferably at least any one of a salt of a polyvalent metal ion and a negative ion described below, polyaluminum hydroxide, and polyaluminum chloride.

Examples of the polyvalent metal ion include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3+}$, and $Zr^{4+}$. In order to blend the polyvalent metal ion into the treatment liquid, a salt of the polyvalent metal may be used.

The salt refers to a metal salt containing the polyvalent metal ion described above and a negative ion to be bonded to the polyvalent metal ion, and is preferably soluble in a solvent. Here, the solvent refers to a medium forming a part of the treatment liquid together with the polyvalent metal salt and examples include water or an organic solvent described below.

Examples of the preferable negative ion for forming a salt with the polyvalent metal ion include $Cl^-$, $NO_3^-$, $I^-$, $Br^-$, $ClO_3^-$, $CH_3COO^-$, and $SO_4^{2-}$.

One kind of the polyvalent metal ion and one kind of the negative ion may be used or two or more kinds of the polyvalent metal ions and two or more kinds of the negative ions may be used in combination to form a salt of the polyvalent metal ion and the negative ion.

Examples of the polyvalent metal salt other than the above include polyaluminum hydroxide and polyaluminum chloride.

In the invention, in view of reactivity, coloring property, ease of handling and the like, the salt of the polyvalent metal ion and the negative ion is preferably used. As the polyvalent metal ion, at least one selected from $Ca^{2+}$, $Mg^{2+}$, $Sr^{2+}$, $Al^{3+}$, and $Y^{3+}$ is preferable, and $Ca^{2+}$ is more preferable.

As the negative ion, $NO_3^-$ is particularly preferable from the viewpoint of solubility or the like.

The polyvalent metal salt may be used singly or in mixture of two or more thereof.

The content of the polyvalent metal salt is preferably 15% by mass or more with respect to the total mass of the treatment liquid. By adjusting the content of the polyvalent metal salt to 15% by mass or more, the component in the ink composition can be more effectively fixed.

The content of the polyvalent metal salt is more preferably from 15% by mass to 35% by mass and further more preferably from 20% by mass to 30% by mass, with respect to the total mass of the treatment liquid.

The application amount of the polyvalent metal salt to a recording medium is not particularly limited insofar as the amount is sufficient for aggregating the ink composition. From the viewpoint of ease of fixation of the ink composition, the amount is preferably from 0.5 g/m$^2$ to 4.0 g/m$^2$, and more preferably from 0.9 g/m$^2$ to 3.75 g/m$^2$.

Cationic Polymer

Examples of the cationic polymer include at least one kind of cationic polymer selected from a poly(vinylpyridine) salt, polyalkylaminoethyl acrylate, polyalkylaminoethyl methacrylate, poly(vinylimidazole), polyethyleneimine, polybiguanide, and polyguanide.

The cationic polymer may be used singly or in combination of two or more thereof.

Among the above cationic polymers, polyguanide (preferably poly(hexamethylene guanidine)acetate, polymonoguanide, and polymeric biguanide), polyethyleneimine, or poly(vinylpyridine) is preferable since it is advantageous in the aggregation rate.

The weight average molecular weight of the cationic polymer is preferably smaller in terms of the viscosity of the treatment liquid. When the treatment liquid is applied to a recording medium by an inkjet method, the weight average molecular weight is preferably in the range of from 500 to 500,000, more preferably in the range of from 700 to 200,000, and still more preferably in the range of from 1,000 to 100,000. The weight average molecular weight of 500 or more is advantageous in terms of the aggregation rate and the weight average molecular weight of 500,000 or less is advantageous in terms of ejection reliability. However, the same does not necessarily apply to the case where the treatment liquid is applied to a recording medium by methods other than the inkjet method.

When the treatment liquid contains the cationic polymer, the pH (25° C.) of the treatment liquid is preferably from 1.0 to 10.0, more preferably from 2.0 to 9.0, and still more preferably from 3.0 to 7.0.

The content of the cationic polymer is preferably from 1% by mass to 35% by mass and more preferably from 5% by mass to 25% by mass, with respect to the total mass of the treatment liquid.

The application amount of the cationic polymer to a recording medium is not particularly limited insofar as the amount is sufficient for aggregating the ink composition. From the viewpoint of ease of fixation of the ink composition, the application amount is preferably from 0.5 g/m$^2$ to 4.0 g/m$^2$, and more preferably from 0.9 g/m$^2$ to 3.75 g/m$^2$.

According to the second aspect of the invention, an ink set is provided which includes:

an ink composition including:
(Component a) a polymerizable compound having an ethylenically unsaturated double bond;
(Component b) a polymerization initiator; and
(Component c) water,
wherein the (Component a) polymerizable compound includes a monofunctional polymerizable monomer (a1) having a (meth)acrylamide structure, and
wherein a content of the monofunctional polymerizable monomer (a1) is 5% by mass or more with respect to a total content of the (Component a) polymerizable compound; and a treatment liquid including:
(Component e) an aggregating agent that is capable of forming an aggregate upon contact with the ink composition; and
(Component f) a polyhydric alcohol having an alkyleneoxy chain.

The specifics, including examples and preferable ranges, of each of the (Component a) polymerizable compound having an ethylenically unsaturated bond, (Component b) polymerization initiator, and (Component c) water, which are used in the second aspect of the invention, are the same as those described in the first aspect.

The specifics, including examples and preferable ranges, of the (Component f) polyhydric alcohol having an alkyleneoxy chain according to the second aspect are the same as those of the (Component d) polyhydric alcohol described in the first aspect, except for the content of the (Component f) with respect to the treatment liquid.

In the second aspect, the content of the (Component f) with respect to the treatment liquid is preferably from 0.5% by mass to 50% by mass, more preferably from 1% by mass to 30% by mass, and most preferably from 5% by mass to 15% by mass.

The specifics, including examples and preferable ranges, of the aggregating agent included in the treatment liquid according to the second aspect are the same as those of the aggregating agent described in the first aspect.

The inventors of the present invention have found that the effects of the invention are attained when the ink composition of the invention has a configuration according to the first or second aspect of the invention. The mechanisms thereof are not clear, but the inventors assume as follows.

That is, it is assumed that, since the polyhydric alcohol used in the invention has an alkyleneoxy chain with a specific chain length, the polyhydric alcohol has a relatively large number of binding points at which a strong bond such as a hydrogen bond is formed with the polymerizable monomer having a (meth)acrylamide structure. Therefore, it is assumed that the crosslinking density between the polyhydric alcohol and the monomer having a (meth)acrylamide structure is relatively high, as a result of which the rub-off resistance and adhesiveness of an ink to a recording medium in a tape-detachment test, and the like are improved. However, the above-mentioned mechanism is merely an assumption of the inventors, and is not intended to restrict the present invention.

Image Forming Method

The scope of an image forming method of the invention includes at least a treatment liquid application process of applying the treatment liquid contained in the ink set onto a recording medium, an ink application process of applying the ink composition contained in the ink set onto a recording medium to form an image, and optionally other processes, as necessary.

Treatment Liquid Application Process

In the treatment liquid application process, the treatment liquid that is contained in the ink set is applied onto a recording medium. For the application of the treatment liquid to the recording medium, a known liquid application method can be used without particular limitation, and an arbitrary method such as spray coating or coating with a coating roller, application by an inkjet method, or immersion, may be selected.

Specific examples include a size press method such as a horizontal size press method, a roll coater method, a calendar size press method; a knife coater method such as an air knife coater method; a roll coater method such as a transfer roll coater method (for example, a gate roll coater method), a direct roll coater method, a reverse roll coater method, a squeeze roll coater method; a blade coater method such as a billblade coater method, a short dwell coater method, a two stream coater method; a bar coater method such as a rod bar coater method; a cast coater method; a gravure coater method; a curtain coater method; a die coater method; a brush coater method; and a transfer method.

A method in which coating is performed while controlling the coating amount using a coating apparatus having a liquid amount controlling member as in the case of the coating apparatus described in JP-A No. 10-230201 may be used.

The treatment liquid may be applied to the entire surface of the recording medium, that is, entire surface application, or may be applied to a region on which inkjet recording is performed in the ink application process, that is, partial surface application. In the invention, from the viewpoint of adjusting the application amount of the treatment liquid uniformely, uniformly recording fine lines, fine image portions, or the like, and suppressing density unevenness such as image unevenness or the like, the entire surface application in which the treatment liquid is applied to the entire surface of a coated paper by coating with a coating roller or the like, is preferable.

Examples of a method of applying the treatment liquid while controlling the application amount of the treatment liquid to the range described above include a method of using an anilox roller. The anilox roller is a roller in which a surface of the roller which is subjected to thermal spray coating with ceramics is processed with laser and is formed into a pyramidal shape, a slant-lined shape, a hexagonal shape, or the like. When the treatment liquid infiltrates dimples provided on the surface of the roller, contacts the paper surface, and is transferred, the treatment liquid is applied with a coating amount adjusted by the dimples of the anilox roller.

Ink Application Process

In the ink application process according to the invention, the ink composition contained in the ink set is applied onto a recording medium. As a method for applying the ink composition, a known ink application method may be used without particular limitation insofar as the ink composition can be applied in the shape of a desired image. Examples include a method of applying the ink composition onto a recording medium by a method such as an inkjet method, a copying system, or a stamping and transfer system. In particular, from the viewpoint of reducing the size of a recording apparatus and high-speed recordability, a process of applying the ink composition by an inkjet method is preferable.

Inkjet Method

In the image formation by an inkjet method, the ink composition is ejected onto a recording medium by applying energy, and a colored image is formed. As an inkjet recording method preferable to the invention, the method described in paragraphs 0093 to 0105 of JP-A No. 2003-306623 can be applied.

The inkjet method is not particularly limited and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by a radiation pressure generated by irradiation of ink with acoustic beams that have been converted from electrical signals; or the like.

The inkjet head for use in an inkjet method may be either anon-demand type head or a continuous type head. An ink nozzle to be used when recording is performed by the inkjet method is not particularly limited and may be selected as appropriate according to purposes.

Examples of the inkjet method include a method in which a large number of small-volume droplets of an ink having a low density, which is called a photo ink, are ejected; a method in which inks of substantially the same color hue at different densities are used to improve image quality; and a method in which a clear and colorless ink is used.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned, and a conveyance system, such as carriage or the like, which moves the short head in a scanning manner is unnecessary. Since a complicated scan-movement control of the movement of the carriage and the recording medium is unnecessary and only the recording medium is moved, the recording speed can be increased compared to the shuttle system.

In the invention, the order of carrying out the treatment liquid application process and the ink application process is not particularly limited, and an embodiment in which the ink application process is performed after the treatment liquid application process is preferable from the viewpoint of image quality. More specifically, the ink application process is preferably a process of applying the ink composition onto a recording medium to which the treatment liquid has been applied.

Active Energy Ray Irradiation Process

The scope of the image forming method according to the invention preferably includes a process of irradiating the ink composition applied onto the recording medium with an active energy ray. By irradiating with an active energy ray, the polymerizable monomer contained in the ink composition polymerizes to form a cured film containing a colorant. Thus, the rub-off resistance and blocking resistance of the image are more effectively improved.

The ink composition applied onto the recording medium is cured by irradiating with an active energy ray. This is because the initiator contained in the ink composition of the invention decomposes due to the irradiation of the active energy ray to generate an initiation species such as a radical, an acid, or a base, and the initiation species initiates and promotes the polymerization reaction of the polymerizable monomer, whereby the ink composition is cured.

Here, examples of the active energy ray to be used include an $\alpha$ ray, a $\gamma$ ray, a $\beta$ ray, an electron beam, an X-ray, an ultraviolet ray, visible light, and infrared light. For example, the wavelength of the active energy ray is preferably from 200 to 600 nm, more preferably from 300 to 450 nm, and still more preferably from 350 to 420 nm.

The output of active energy ray is preferably 5,000 mJ/cm$^2$ or less, more preferably from 10 to 4,000 mJ/cm$^2$, and still more preferably from 20 to 3,000 mJ/cm$^2$.

As the source of the active energy ray, a mercury lamp, a gas laser, a solid laser, and the like are mainly utilized. As the light source to be used for curing an ultraviolet-ray curing ink, a mercury lamp and a metal halide lamp are widely known. However, there is a strong need for mercury-free devices from the viewpoint of the current environmental protection. The replacement with a GaN semiconductor ultraviolet ray-emitting device is very useful from the industrial and environmental standpoints. A preferable light source to be used in the invention is a metal halide lamp.

A light-emitting diode (LED) and a laser diode (LD) have a small size, a long lifetime, a high efficiency, and a low cost and thus are attracting attention as sources of an active energy ray. An ultraviolet LED or an ultraviolet LD can be used when an ultraviolet ray source is required. For example, a purple LED in which the main emission spectrum has a wavelength between 365 nm and 420 nm is commercially available from Nichia Corporation. A particularly preferable light source according to the invention is a ultraviolet LED having a peak wavelength of from 350 to 420 nm.

Ink Drying Process

The scope of the image forming method according to the invention may include an ink drying process of drying and removing an ink solvent (for example, water, a water-soluble organic solvent, or the like) contained in the ink composition applied onto the recording medium, as required. As the ink drying process, generally used methods can be applied without particular limitation insofar as at least a part of the ink solvent can be removed.

For example, ink drying can be performed by a known heating method such as a heater, an air blowing method utilizing air blowing such as a drier, or a combination thereof. Examples of the heating method include a method including giving heat with a heater or the like from the side opposite to the side of the recording medium to which the treatment liquid is applied, a method including blowing warm air or hot air to the surface of the recording medium to which the treatment liquid is applied, and a heating method using an infrared heater, and two or more of the heating methods may be performed in combination.

The ink drying process may be performed after the ink application process, and may be performed before or after the active energy ray irradiation process. In the invention, the ink drying process is preferably performed before the active energy ray irradiation process from the viewpoint of curing sensitivity and blocking resistance.

Recording Medium

The recording medium for use in the image forming method according to the invention is not particularly limited, and may be general printing paper containing cellulose as the major component such as high-quality paper, coat paper or art paper for use in general offset printing and the like. When image recording is performed on the general printing paper containing cellulose as the major component by a general inkjet method with an ink, absorption and drying of the ink is relatively slow, and colorant migration likely occurs after ejecting ink droplets, whereby image quality is apt to degrade. However, when image recording is conducted by the image forming method according to the invention, a high-grade image recording having excellent color density and hue can be achieved while suppressing the colorant migration.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI jo-shitsu (New NPI high-quality; trade name) manufactured by Nippon Paper Industries Co., Ltd.; high-quality coat papers such as SILVER DIAMOND (trade name) manufactured by Nippon Paper Industries Co., Ltd.; ultra light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd., TOPKOTE N-PLUS (trade name) manufactured by Oji Paper Co., Ltd., and AURORA COAT (trade name) manufactured by Nippon Paper Industries Co., Ltd.; and art papers (A1) such as KIN-FUJI (2/SIDE GOLDEN CASK GLOSS) (trade name) manufactured by Oji Paper Co., Ltd. and TOKUBISHI ART (trade name) and TOKUBISHI ART DOUBLE-SIDED N (trade name) both manufactured by Mitsubishi Paper Mills Ltd. As the recording medium, various inkjet-recording papers exclusively for photos may be used.

Among the above, from the viewpoint of obtaining a high-quality image having better color density and hue than conventionally and having an effect of highly suppressing colorant migration, a water absorption coefficient Ka of the recording medium is preferably from 0.05 to 0.5 $mL/m^2 \cdot ms^{1/2}$, more preferably from 0.1 to 0.4 $mL/m^2 \cdot ms^{1/2}$, and still more preferably from 0.2 to 0.3 $mL/m^2 \cdot ms^{1/2}$.

The water absorption coefficient Ka has the same meaning as that described in JAPAN TAPPI pulp and paper test method No. 51:2000 (published by Japan Technical Association of the Pulp and Paper Industry). Specifically, the water absorption coefficient Ka is determined by calculating the difference in the amount of transferred water between at a contact time of 100 ms and at a contact time of 900 ms measured with an automatic scanning liquid absorptometer KM500Win (trade name, manufactured by Kumagai Riki Kogyo Co., Ltd.).

Among the recording media, a so-called coated paper for use in general offset printing is preferable. The coated paper is obtained by applying a coating material to a surface of general non-surface-treated high-quality paper containing cellulose as the major component, neutralized paper or the like to form a coating layer thereon. In usual image forming by an inkjet method, the coated paper is likely to cause a problem in quality such as image glossiness, rub-off resistance, or the like. However, when image recording is conducted by the image forming method according to the invention, an image having favorable glossiness and rub-off resistance can be obtained while suppressing uneven glossiness. In particular, coated paper having a base paper and a coating layer containing kaolin and/or calcium bicarbonate is preferably used. More specifically, art paper, coat paper, lightweight coat paper, and ultra light-weight coated paper are more preferable.

EXAMPLES

Hereinafter, the invention is further specifically described with reference to Examples but is not limited to the Examples. Unless otherwise specified, "part(s)" and "%" are based on mass.

Preparation of Polymer Dispersant Solution 1

6 parts of styrene, 11 parts of stearyl methacrylate, 4 parts of styrene macromer (AS-6, trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol, and 24 parts of methyl ethyl ketone were added into a reaction vessel to prepare a mixed solution.

Separately, 14 parts of styrene, 24 parts of stearyl methacrylate, 9 parts of styrene macromer (AS-6, trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dripping funnel to prepare a mixed solution.

In a nitrogen atmosphere, the mixed solution in the reaction vessel was heated to 75° C. while stirring, and the mixed solution in the dripping funnel was gradually dripped into the reaction vessel over one hour. Two hours after the completion of the dripping, a solution in which 1.2 parts of 2,2'-azobis(2, 4-dimethylvaleronitrile) was dissolved in 12 parts of methyl ethyl ketone was dripped into the reaction vessel over three hours. The mixed solution was further aged at 75° C. for two hours and then at 80° C. for two hours, thereby obtaining polymer dispersant solution 1.

A part of the obtained polymer dispersant solution 1 was isolated by removing the solvent, and the obtained solid content was diluted with tetrahydrofuran to 0.1 mass % to obtain a sample. The sample was subjected to high-speed GPC (gel permeation chromatography) using HLC-8220 GPC (three columns: TSKgeL Super HZM-H, TSKgeL Super HZ4000, and TSKgeL Super HZ2000 (manufactured by Tosoh Corporation) connected in series). The weight average molecular weight of the polymer as measured was 25,000 (as a polystyrene-equivalent value), and the acid value of the polymer as measured in accordance with the method described in JIS standards (JIS K0070:1992) was 99 mgKOH/g.

Preparation of Pigment Dispersion Liquid M 5.0 g (in terms of solid content) of the obtained polymer dispersant solution 1, 10.0 g of a magenta pigment (Pigment Red 122, manufactured by Dainichiseika Color & Chemicals Mfg. Co., Ltd.), 40.0 g of methyl ethyl ketone, 8.0 g of 1 mol/L (liter) sodium hydroxide, and 82.0 g of ion exchange water were put in a vessel together with 300 g of 0.1 mm zirconia beads, and were dispersed for 6 hours at 1,000 rpm with a disperser Ready Mill (trade name, manufactured by Aimex Co., Ltd.). The resulting dispersion liquid was condensed under reduced pressure using an evaporator until methyl ethyl ketone was sufficiently removed, and the dispersion liquid was further condensed until the concentration of pigment reached 10%. Pigment dispersion liquid M was thus obtained, in which the water-dispersible pigment was dispersed.

The volume average particle diameter (secondary particles) of the resulting pigment dispersion liquid M as measured by a dynamic light scattering method using a MICROTRAC particle size distribution meter (Version 10.1.2-211 BH (trade name), manufactured by Nikkiso Co., Ltd.) was 84 nm.

Preparation of Pigment Dispersion Liquid Y

Pigment dispersion liquid Y of a resin-coated yellow pigment was obtained in the same manner as in the preparation of pigment dispersion liquid M, except that IRGALITE YELLOW GS (trade name, Pigment Yellow 74, manufactured by BASF Japan Ltd.) was used instead of Pigment Red 122 (manufactured by Dainichiseika Color & Chemicals Mfg. Co., Ltd.) as the pigment.

The volume average particle diameter (secondary particles) of the resulting pigment dispersion liquid Y as measured in a similar manner to pigment dispersion liquid M was 75 nm.

Preparation of Pigment Dispersion Liquid K

Pigment dispersion liquid K of a resin-coated black pigment was obtained in the same manner as in the preparation of pigment dispersion liquid M, except that a pigment dispersion carbon black (MA-100, trade name, manufactured by Mitsubishi Chemical Corporation) was used instead of Pigment Red 122 (manufactured by Dainichiseika Color & Chemicals Mfg. Co., Ltd.) as the pigment.

The volume average particle diameter (secondary particles) of the resulting pigment dispersion liquid K as measured in a similar manner to pigment dispersion liquid M was 80 nm.

Preparation of Pigment Dispersion Liquid C

As pigment dispersion liquid C, CABO-JET250 C (PB15: 4) (trade name, manufactured by CABOT Japan K.K., a cyan pigment-dispersion liquid) was prepared. The volume average particle diameter (secondary particles) of pigment dispersion liquid C as measured in a similar manner to pigment dispersion liquid M was 110 nm.

Synthesis of Polymerizable Monomer (B-1)

In a 1 L-volume three-necked flask equipped with a stirrer, 40.0 g (182 mmol) of 4,7,10-trioxa-1,13-tridecane diamine, 37.8 g (450 mmol) of sodium hydrogen carbonate, 100 g of water, and 300 g of tetrahydrofuran were placed, and 35.2 g (389 mmol) of acryloyl chloride was added dropwise thereto over 20 minutes in an ice bath. After completion of the dropwise addition, the solution was stirred at room temperature for 5 hours, and tetrahydrofuran was then removed from the resultant reaction mixture under reduced pressure. Subsequently, an aqueous phase was extracted four times with 200 ml of ethyl acetate, and the resultant organic phase was dried using magnesium sulfate, followed by filtration and solvent distillation under reduced pressure, thereby obtaining 35.0 g (107 mmol, yield: 59%) of a solid of a polymerizable monomer (B-1) having the structured shown below.

Synthesis of Polymerizable Monomer (B-2)

A polymerizable monomer (B-2) was synthesized in accordance with the synthesis of the polymerizable monomer (B-1).

Preparation of Self-Dispersing Polymer Particles 360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature inside the flask was increased to 85° C., and stirring was continued for another 2 hours. As a result, a resin solution of a copolymer of phenoxyethyl acrylate/methyl methacrylate/acrylic acid (in a ratio of 50/45/5 by mass) was obtained.

The weight average molecular weight (Mw) of the obtained copolymer as measured in a similar manner to polymer dispersant solution 1 was 64,000 (calculated as polystyrene-equivalent value according to gel permeation chromatography (GPC)). The acid value of the copolymer was found to be 38.9 mgKOH/g.

Then, 668.3 g of the obtained resin solution was weighed, and 388.3 g of isopropanol and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form a water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the inside of the reaction vessel was depressurized, and the isopropanol, the methyl ethyl ketone, and the distilled water were removed in a total amount of 913.7 g. As a result, a water dispersion of self-dispersing polymer particles having a solid concentration of 28.0% by mass was obtained.

Preparation of Ink Composition

The components shown in Table 1 were mixed, and then subjected to filtration using a membrane filter (having a pore size of 5 μm), thereby preparing ink compositions 1 to 14 and ink composition 21.

TABLE 1

| | | Ink composition No. | | | | | | | |
|---|---|---|---|---|---|---|---|---|---|
| | | 1 | 2 | 3 | 4 | 5 | 6 | 7 | 8 |
| Pigment dispersion liquid (solid content) | M | 4 | 4 | 4 | 4 | 4 | 4 | 4 | — |
| | C | — | — | — | — | — | — | — | 4 |
| | Y | — | — | — | — | — | — | — | — |
| | K | — | — | — | — | — | — | — | — |
| (Component a) Monofunctional polymerizable monomer (a1) having (meth)acrylamide structure | A-1 | 10 | 10 | 10 | 10 | 15 | 18 | 20 | 20 |
| | A-2 | — | — | — | — | — | — | — | — |
| Polyfunctional polymerizable monomer (Component d) | B-1 | 10 | 10 | 10 | 10 | 5 | 2 | — | — |
| | B-2 | — | — | — | — | — | — | — | — |
| Polyhydric alcohol having alkyleneoxy chain | Z-1 | 3 | — | — | — | 5 | 5 | 5 | 5 |
| | Z-2 | — | 3 | — | — | — | — | — | — |
| | Z-3 | — | — | 3 | — | — | — | — | — |
| | Z-4 | — | — | — | 3 | — | — | — | — |
| (Component b) Polymerization initiator | | colspan: 3 | | | | | | | |
| Self-dispersing polymer (solid content) | | colspan: 1 | | | | | | | |
| Surfactant | | colspan: 1 | | | | | | | |
| (Component c) Ion-exchange water | | colspan: Balance (total = 100%) | | | | | | | |

| | | Ink composition No. | | | | | | |
|---|---|---|---|---|---|---|---|---|
| | | 9 | 10 | 11 | 12 | 13 | 14 | 21 |
| Pigment dispersion liquid (solid content) | M | — | — | 4 | 4 | 4 | 4 | 4 |
| | C | — | — | — | — | — | — | — |
| | Y | 4 | — | — | — | — | — | — |
| | K | — | 4 | — | — | — | — | — |
| (Component a) Monofunctional polymerizable monomer (a1) having (meth)acrylamide structure | A-1 | 20 | 20 | 10 | — | 10 | 5 | 10 |
| | A-2 | — | — | — | 10 | — | — | — |
| Polyfunctional polymerizable monomer (Component d) | B-1 | — | — | — | 10 | 10 | 15 | 10 |
| | B-2 | — | — | 10 | — | — | — | — |
| Polyhydric alcohol having alkyleneoxy chain | Z-1 | 5 | 5 | 3 | 3 | 20 | 5 | — |
| | Z-2 | — | — | — | — | — | — | — |
| | Z-3 | — | — | — | — | — | — | — |
| | Z-4 | — | — | — | — | — | — | — |
| (Component b) Polymerization initiator | | colspan: 3 | | | | | | |
| Self-dispersing polymer (solid content) | | colspan: 1 | | | | | | |
| Surfactant | | colspan: 1 | | | | | | |
| (Component c) Ion-exchange water | | colspan: Balance (total = 100%) | | | | | | |

In Table 1, the symbol "-" indicates that respective components are not included, and the numerical values indicate content in terms of mass (i.e., % by mass).

The (Component b) polymerization initiator shown in Table 1 is IRGACURE 2959 (trade name, manufactured by BASF Japan Ltd.), and the surfactant shown in Table 1 is OLFINE E1010 (trade name, manufactured by Nissin Chemical Industry Co., Ltd.).

In Table 1, the monofunctional polymerizable monomer (A-1) having a (meth)acrylamide structure is hydroxyethyl acrylamide (having the structure shown below), and the monofunctional polymerizable monomer (A-2) having a (meth)acrylamide structure is isopropyl acrylamide (manufactured by Kohjin Co., Ltd.).

In Table 1, the polyfunctional polymerizable monomers (B-1) and (B-2) having a (meth)acrylamide structure are the compounds obtained by the synthesis described above, which are represented by the following structural formulae.

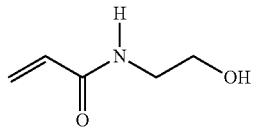

(A-1)

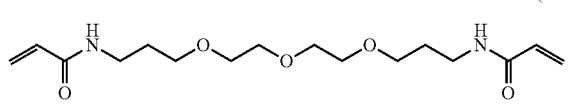

(B-1)

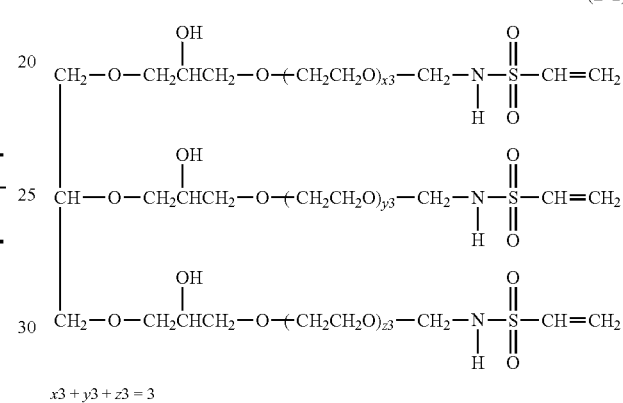

(B-2)

$x3 + y3 + z3 = 3$

In Table 1, the polyhydric alcohol (Z-1) is pentaerythritol polyoxyethylene ether (trade name: PNT-40, manufactured by Nippon Nyukazai Co., Ltd.), the polyhydric alcohol (Z-2) is polyoxypropylene sorbitol ether (trade name: SANNIX SP-750, manufactured by Sanyo Chemical Industries, Ltd.), the polyhydric alcohol (Z-3) is polyoxypropylene glyceryl ether (trade name: SANNIX GP-250, manufactured by Sanyo Chemical Industries, Ltd., having the following structure shown below), and the polyhydric alcohol (Z-4) is tetraethylene glycol (having the structure shown below).

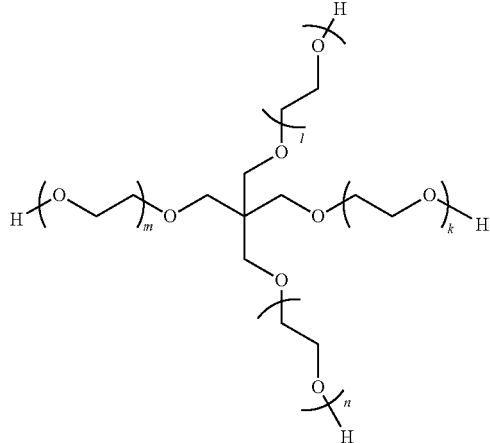

(Z-1)

-continued

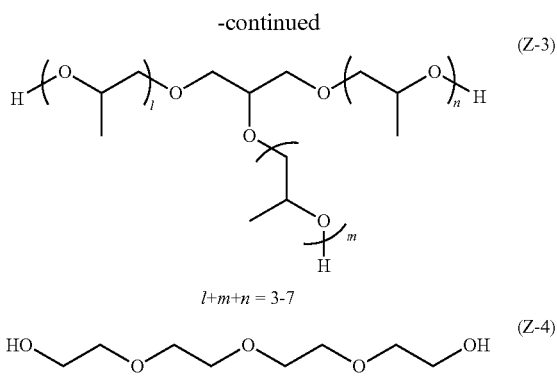

$l+m+n = 3-7$

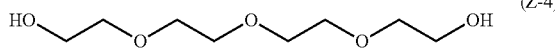

Preparation of Treatment Liquid

The components described in the following (Formulation of treatment liquid 1) were mixed, thereby preparing a treatment liquid 1. The pH (at 25° C.) of the treatment liquid 1 was measured using a pH meter (trade name: WM-50EG, manufactured by DKK-Toa Corporation), and was found to be 1.02. Separately, the components described in the following (Formulation of treatment liquid 2) were mixed, thereby preparing a treatment liquid 2.

| (Formulation of treatment liquid 1) | |
|---|---|
| Malonic acid ((Component e), manufactured by Wako Pure Chemical Industries, Ltd.) | 25% |
| Diethylene glycol monomethyl ether (manufactured by Wako Pure Chemical Industries, Ltd.) | 20% |
| EMULGEN P109 (trade name, manufactured by Kao Corporation; nonionic surfactant) | 1% |
| Ion-exchange water | Balance (total = 100%) |
| (Formulation of treatment liquid 2) | |
| Malonic acid ((Component e), manufactured by Wako Pure Chemical Industries, Ltd.) | 25% |
| Diethylene glycol monomethyl ether (manufactured by Wako Pure Chemical Industries, Ltd.) | 20% |
| EMULGEN P109 (trade name, manufactured by Kao Corporation; nonionic surfactant) | 1% |
| Pentaerythritol polyoxyethylene ether (trade name: PNT-40, manufactured by Nippon Nyukazai Co., Ltd., (Component f)) | 10% |
| Ion-exchange water | Balance (total = 100%) |

An image was formed by the method described below using a combination of at least one of the ink compositions 1 to 14 and 21 with at least one of the treatment liquids 1 and 2 as shown in Table 2, and the adhesiveness of an ink to a recording medium in a tape-detachment test and rub-off resistance were evaluated. Results of the evaluation are shown in Table 2.

Image Formation

Image formation was carried out by the method described below.

The treatment liquid obtained above was applied on TOKUBISHI ART DOUBLE-SIDED N sheet (trade name, manufactured by Mitsubishi Paper Mills Ltd.) so as to have a film thickness of about 2 μm using a wire bar coater, and then dried.

TOKUBISHI ART DOUBLE-SIDED N sheet having applied the treatment liquid thereon was fixed on a stage that is capable of moving at 500 mm/sec. Thereafter, the ink composition obtained above was charged into a cartridge of GELJET GX5000 (trade name, manufactured by Ricoh Company), and a solid image of cyan, magenta, yellow, or black was printed by a line method using a GELJET GX5000 printer head which was arranged and fixed at an angle with respect to the scanning direction at a resolution of 1200×600 dpi and an ink ejection amount of 3.5 pL.

Immediately after the printing, the image was dried at 60° C. for 3 seconds, and then irradiated with an ultraviolet ray at an irradiation amount of 1,500 mJ/cm² using a metal halide lamp (manufactured by Eye Graphics Co., Ltd.; maximum irradiation wavelength=365 nm) to cure an image portion, thereby producing a print sample.

Evaluation

Rub-Off Resistance

The sample of the solid image produced in the image forming method was left to stand under an environment of 25° and 50% RH for 72 hours. Thereafter, the sample of the solid image sample which was left to stand was superimposed on an unprinted TOKUBISHI ART DOUBLE-SIDED N sheet (which may be referred to as an unused sample), and the surface of the sample of the solid image was rubbed 10 times with a load of 200 kg/m². Thereafter, the unused sample and the solid image were visually observed, and evaluated in accordance with the evaluation criteria described below. Evaluation results are shown in Table 2.

Evaluation Criteria

5: No color transfer to the unused sample, and no deterioration of the rubbed solid image was observed.

4: Color transfer to the unused sample was observed, but no deterioration of the rubbed solid image was observed.

3: Color transfer to the unused sample was observed, and deterioration was observed in a part of the rubbed solid image.

2: Color transfer to the unused sample was observed, and deterioration was observed across the entire surface of the rubbed solid image.

1: At least a part of the rubbed solid image was completely rubbed off, and a paper surface was exposed.

It should be noted that the evaluation criteria 3 to 5 indicate practically non-problematic levels.

Adhesiveness of an Ink to a Recording Medium in a Tape-Detachment Test

A print sample was produced in a manner substantially the same as in the production of the print sample for the evaluation method for rub-off resistance. Strips of adhesive tape (registered trademark: CELLOTAPE, manufactured by Nichiban Co., Ltd.) were adhered to the print sample so that the tape strips were adhered to the entire surface of the print samples, and immediately removed. Color transfer to the removed tape and the paper surface in the region from which the tape strips had been removed was observed, and the adhesiveness of an ink to a recording medium in a tape-detachment test was evaluated in accordance with the following evaluation criteria.

Evaluation Criteria

5: No color transfer to the adhesive tape was observed, and no image peeling on the paper surface was observed.

4: A slight amount of color transfer to the adhesive tape was observed, but no image peeling on the paper surface was observed.

3: A slight amount of color transfer to the adhesive tape was observed, and a slight amount of image peeling on the paper surface was also observed.

2: A color transfer to the adhesive tape was clearly observed, and image peeling on the paper surface was readily observed.

1: A color transfer to the adhesive tape was observed over the entire surface, and image peeling on the paper surface was observed.

It should be noted that the evaluation criteria 3 to 5 indicate practically non-problematic levels.

TABLE 2

| Ink composition No. | Pigment | Treatment liquid | (Component f) Polyhydric alcohol in treatment liquid Type | Content (mass %) | Content of polymerizable monomer (mass %) Monofunctional polymerizable monomer (a1) having (meth)acrylamide structure | | Polyfunctional polymerizable monomer having (meth)acrylamide structure | |
|---|---|---|---|---|---|---|---|---|
| Example 1 | 1 | M | 1 | — | — | (A-1) | 10 | (B-1) | 10 |
| Example 2 | 2 | M | 1 | — | — | (A-1) | 10 | (B-1) | 10 |
| Example 3 | 3 | M | 1 | — | — | (A-1) | 10 | (B-1) | 10 |
| Example 4 | 4 | M | 1 | — | — | (A-1) | 10 | (B-1) | 10 |
| Example 5 | 5 | M | 1 | — | — | (A-1) | 15 | (B-1) | 5 |
| Example 6 | 6 | M | 1 | — | — | (A-1) | 18 | (B-1) | 2 |
| Example 7 | 7 | M | 1 | — | — | (A-1) | 20 | (B-1) | — |
| Example 8 | 8 | C | 1 | — | — | (A-1) | 20 | (B-1) | — |
| Example 9 | 9 | Y | 1 | — | — | (A-1) | 20 | (B-1) | — |
| Example 10 | 10 | K | 1 | — | — | (A-1) | 20 | (B-1) | 0 |
| Example 11 | 11 | M | 1 | — | — | (A-1) | 10 | (B-2) | 10 |
| Example 12 | 12 | M | 1 | — | — | (A-2) | 10 | (B-1) | 10 |
| Example 13 | 21 | M | 2 | Z-1 | 10 | (A-1) | 10 | (B-1) | 10 |
| Example 14 | 1 | M | 2 | Z-1 | 10 | (A-1) | 10 | (B-1) | 10 |
| Example 15 | 13 | M | 1 | — | — | (A-1) | 10 | (B-1) | 10 |
| Example 16 | 14 | M | 1 | — | — | (A-1) | 5 | (B-1) | 15 |
| Comparative example | 21 | M | 1 | — | — | (A-1) | 10 | (B-1) | 10 |

| | (Component d) polyhydric alcohol in ink composition Type | Content (mass %) | Proportion of monofunctional polymerizable monomer (a1) having (meth)acrylamide structure with respect to (Component a) polymerizable compound having ethylenically unsaturated double bond (mass %) | Evaluation Adhesiveness of ink to recording medium in tape-detachment test | Rub-off resistance |
|---|---|---|---|---|---|
| Example 1 | Z-1 | 3 | 50 | 5 | 5 |
| Example 2 | Z-2 | 3 | 50 | 5 | 5 |
| Example 3 | Z-3 | 3 | 50 | 3 | 3 |
| Example 4 | Z-4 | 3 | 50 | 3 | 3 |
| Example 5 | Z-1 | 5 | 75 | 5 | 4 |
| Example 6 | Z-1 | 5 | 90 | 4 | 4 |
| Example 7 | Z-1 | 5 | 100 | 4 | 4 |
| Example 8 | Z-1 | 5 | 100 | 4 | 4 |
| Example 9 | Z-1 | 5 | 100 | 4 | 4 |
| Example 10 | Z-1 | 5 | 100 | 3 | 3 |
| Example 11 | Z-1 | 3 | 50 | 5 | 5 |
| Example 12 | Z-1 | 3 | 50 | 4 | 4 |
| Example 13 | — | — | 50 | 4 | 4 |
| Example 14 | Z-1 | 3 | 50 | 5 | 5 |
| Example 15 | Z-1 | 20 | 50 | 3 | 3 |
| Example 16 | Z-1 | 5 | 50 | 4 | 4 |
| Comparative example | — | — | 50 | 2 | 1 |

In Table 2, the symbol "-" indicates that respective components are not included.

As shown in Table 2, in Examples of the invention, images having an excellent adhesiveness of an ink to a recording medium in a tape-detachment test and an excellent rub-off resistance were obtained.

According to the invention, an ink composition is provided which imparts excellent rub-off resistance and excellent adhesiveness of an ink to a recording medium in a tape-detachment test to an image recorded by an inkjet method.

Embodiments of the present invention include, but are not limited to, the following.

<1> An ink composition, comprising:
(Component a) a polymerizable compound having an ethylenically unsaturated double bond;
(Component b) a polymerization initiator;
(Component c) water; and (Component d) a polyhydric alcohol having an alkyleneoxy chain,
wherein the (Component a) polymerizable compound comprises a monofunctional polymerizable monomer having a (meth)acrylamide structure, and
a content of the monofunctional polymerizable monomer is 5% by mass or more with respect to a total content of the (Component a) polymerizable compound.

<2> The ink composition according to <1>, wherein the (Component d) polyhydric alcohol is a dihydric to hexahydric alcohol.

<3> The ink composition according to <1> or <2>, wherein the content of the monofunctional polymerizable monomer is from 5% by mass to 100% by mass with respect to the total content of the (Component a) polymerizable compound.

<4> The ink composition according to any one of <1> to <3>, wherein the alkyleneoxy chain in the (Component d) polyhydric alcohol is represented by the following Formula 1:

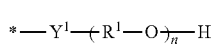

Formula I wherein, in Formula 1, $R^1$ represents an alkylene group; $Y^1$ represents a single bond or —O—; n represents an integer of from 1 to 6; and when plural $R^1$'s are present, plural $R^1$'s may be the same as or different from one another.

<5> The ink composition according to any one of <1> to <4>, wherein the (Component d) polyhydric alcohol is represented by the following Formula 2:

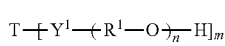

Formula 2 wherein, in Formula 2, T represents a residue obtained by removing m hydrogen atoms from a hydrocarbon; $R^1$ represents an alkylene group; $Y^1$ represents a single bond or —O—; m represents an integer of from 2 to 6; n represents an integer of from 1 to 6; plural $Y^1$'s may be the same as or different from one another; and plural $R^1$'s may be the same as or different from one another.

<6> The ink composition according to any one of <1> to <5>, wherein the monofunctional polymerizable monomer has a structure represented by the following Formula (M-1):

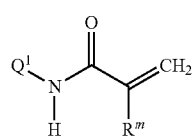

(M-1)

wherein, in Formula (M-1), $Q^1$ represents a hydrophilic group; and $R^m$ represents a hydrogen atom or a methyl group.

<7> The ink composition according to any one of <1> to <6>, wherein the (Component a) polymerizable compound further comprises a polyfunctional polymerizable monomer having a (meth)acrylamide structure.

<8> The ink composition according to <7>, wherein the polyfunctional polymerizable monomer has a structure represented by the following Formula (M-2):

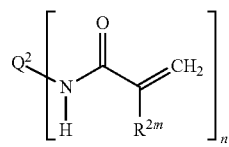

(M-2)

wherein, in Formula (M-2), $Q^2$ represents an n-valent linking group; $R^{2m}$ represents a hydrogen atom or a methyl group; and n represents an integer of 2 or more.

<9> The ink composition according to any one of <1> to <8>, further comprising a colorant.

<10> The ink composition according to any one of <1> to <9>, wherein the polymerization initiator is a photopolymerization initiator.

<11> The ink composition according to any one of <1> to <10>, wherein the polymerization initiator is an aromatic ketone.

<12> The ink composition according to any one of <1> to <11>, wherein the polymerization initiator is 1-[4-(2-hydroxyethoxy)-phenyl]-2-hydroxy-2-methyl-1-propane-1-one.

<13> The ink composition according to any one of <1> to <12>, wherein the total content of the (Component d) polyhydric alcohol is; from 0.5% by mass to 30% by mass with respect to the total amount of the ink composition.

<14> An ink set, comprising:
the ink composition according to any one of <1> to <13>; and
a treatment liquid comprising (Component e) an aggregating agent that is capable of forming an aggregate upon contact with the ink composition.

<15> The ink set according to <14>, wherein the treatment liquid further comprises (Component f) a polyhydric alcohol having an alkyleneoxy chain.

<16> An ink set, comprising:
an ink composition comprising:
(Component a) a polymerizable compound having an ethylenically unsaturated double bond;
(Component b) a polymerization initiator; and
(Component c) water,
wherein the (Component a) polymerizable compound comprises a monofunctional polymerizable monomer having a (meth)acrylamide structure, and
wherein a content of the monofunctional polymerizable monomer is 5% by mass or more with respect to a total content of the (Component a); and
a treatment liquid comprising:
(Component e) an aggregating agent that is capable of forming an aggregate upon contact with the ink composition; and
(Component f) a polyhydric alcohol having an alkyleneoxy chain.

<17> A method of forming an image, the method comprising:
providing an ink set comprising the ink composition according to <1> and a treatment liquid including (Component e) an aggregating agent that is capable of forming an aggregate upon contact with the ink composition;
applying, to a recording medium, the treatment liquid included in the ink set; and
applying, on the recording medium, the ink composition included in the ink set to form an image.

All publications, patent applications, and technical standards mentioned in this specification are herein incorporated

What is claimed is:

1. An ink composition, comprising:
(Component a) a polymerizable compound having an ethylenically unsaturated double bond;
(Component b) a polymerization initiator;
(Component c) water; and
(Component d) a polyhydric alcohol having an alkyleneoxy chain,
wherein the (Component a) polymerizable compound comprises a monofunctional polymerizable monomer having a (meth)acrylamide structure,
a content of the monofunctional polymerizable monomer is 5% by mass or more with respect to a total content of the (Component a) polymerizable compound, and
the (Component d) polyhydric alcohol is a tetrahydric to hexahydric alcohol.

2. The ink composition according to claim 1, wherein the content of the monofunctional polymerizable monomer is from 5% by mass to 100% by mass with respect to the total content of the (Component a) polymerizable compound.

3. The ink composition according to claim 1, wherein the alkyleneoxy chain in the (Component d) polyhydric alcohol is represented by the following Formula 1:

Formula I wherein, in Formula 1, $R^1$ represents an alkylene group; $Y^1$ represents a single bond or —O—; n represents an integer of from 1 to 6; and when plural $R^1$'s are present, plural $R^1$'s may be the same as or different from one another.

4. The ink composition according to claim 1, wherein the (Component d) polyhydric alcohol is represented by the following Formula 2:

Formula 2 wherein, in Formula 2, T represents a residue obtained by removing m hydrogen atoms from a hydrocarbon; $R^1$ represents an alkylene group; $Y^1$ represents a single bond or —O—; m represents an integer of from 4 to 6; n represents an integer of from 1 to 6; plural $Y^1$'s may be the same as or different from one another; and plural $R^1$'s may be the same as or different from one another.

5. The ink composition according to claim 1, wherein the monofunctional polymerizable monomer has a structure represented by the following Formula (M-1):

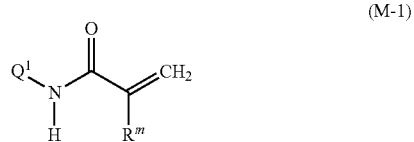

(M-1)

wherein, in Formula (M-1), $Q^1$ represents a hydrophilic group; and $R^m$ represents a hydrogen atom or a methyl group.

6. The ink composition according to claim 1, wherein the (Component a) polymerizable compound further comprises a polyfunctional polymerizable monomer having a (meth)acrylamide structure.

7. The ink composition according to claim 6, wherein the polyfunctional polymerizable monomer has a structure represented by the following Formula (M-2):

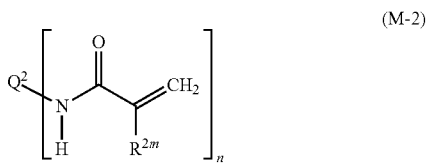

(M-2)

wherein, in Formula (M-2), $Q^2$ represents an n-valent linking group; $R^{2m}$ represents a hydrogen atom or a methyl group; and n represents an integer of 2 or more.

8. The ink composition according to claim 1, further comprising a colorant.

9. The ink composition according to claim 1, wherein the polymerization initiator is a photopolymerization initiator.

10. The ink composition according to claim 1, wherein the polymerization initiator is an aromatic ketone.

11. The ink composition according to claim 1, wherein the polymerization initiator is
1-[4-(2-hydroxyethoxy)-phenyl]-2-hydroxy-2-methyl-1-propane-1-one.

12. The ink composition according to claim 1, wherein the total content of the (Component d) polyhydric alcohol is from 0.5% by mass to 30% by mass with respect to the total amount of the ink composition.

13. An ink set, comprising:
the ink composition according to claim 1; and
a treatment liquid comprising (Component e) an aggregating agent that is capable of forming an aggregate upon contact with the ink composition.

14. The ink set according to claim 13, wherein the treatment liquid further comprises (Component f) a polyhydric alcohol having an alkyleneoxy chain.

15. An ink set, comprising:
an ink composition comprising:
(Component a) a polymerizable compound having an ethylenically unsaturated double bond;
(Component b) a polymerization initiator; and
(Component c) water,
wherein the (Component a) polymerizable compound comprises a monofunctional polymerizable monomer having a (meth)acrylamide structure, and
wherein a content of the monofunctional polymerizable monomer is 5% by mass or more with respect to a total content of the (Component a) polymerizable compound; and
a treatment liquid comprising:
(Component e) an aggregating agent that is capable of forming an aggregate upon contact with the ink composition; and
(Component f) a polyhydric alcohol having an alkyleneoxy chain,
wherein the (Component f) polyhydric alcohol is a tetrahydric to hexahydric alcohol.

16. A method of forming an image, the method comprising:
providing an ink set comprising the ink composition according to claim 1 and a treatment liquid including (Component e) an aggregating agent that is capable of forming an aggregate upon contact with the ink composition;
applying, to a recording medium, the treatment liquid included in the ink set; and
applying, on the recording medium, the ink composition included in the ink set to form an image.

17. The ink composition according to claim 1, wherein the monofunctional polymerizable monomer is hydroxyethyl acrylamide.

* * * * *